United States Patent
Balasubramanian et al.

(10) Patent No.: US 9,369,935 B2
(45) Date of Patent: Jun. 14, 2016

(54) FAST ACQUISITION OF SYSTEMS USING A PRIORITIZATION AND A COMBINATION OF RECENTLY FOUND SYSTEMS AND RECENTLY USED SYSTEMS

(71) Applicant: QUALCOMM Incorporated, San Diego, CA (US)

(72) Inventors: Srinivasan Balasubramanian, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/626,316

(22) Filed: Feb. 19, 2015

(65) Prior Publication Data
US 2015/0245271 A1 Aug. 27, 2015

Related U.S. Application Data

(60) Provisional application No. 61/942,885, filed on Feb. 21, 2014.

(51) Int. Cl.
*H04W 36/24* (2009.01)
*H04W 72/10* (2009.01)
*H04W 36/36* (2009.01)

(52) U.S. Cl.
CPC ............ *H04W 36/245* (2013.01); *H04W 72/10* (2013.01); *H04W 36/36* (2013.01)

(58) Field of Classification Search
CPC .... H04W 36/245; H04W 36/36; H04W 72/10
See application file for complete search history.

(56) References Cited

U.S. PATENT DOCUMENTS

| 8,364,142 | B1 | 1/2013 | Berberian et al. |
| 9,125,146 | B1 * | 9/2015 | Edara et al. ................ 455/432.1 |
| 2003/0134637 | A1 | 7/2003 | Cooper |
| 2004/0033802 | A1 | 2/2004 | Koo et al. |
| 2010/0111043 | A1 | 5/2010 | Balasubramanian et al. |
| 2011/0176436 | A1 | 7/2011 | Swaminathan et al. |
| 2014/0066055 | A1 | 3/2014 | Balakrishnan et al. |
| 2014/0066061 | A1 | 3/2014 | Lou et al. |

FOREIGN PATENT DOCUMENTS

WO  WO-2012160246 A1  11/2012

OTHER PUBLICATIONS

ISA/EPO, International Search Report and Written Opinion of the International Searching Authority, Int'l. App. No. PCT/US2015/016902, May 13, 2015, European Patent Office, Rijswijk, NL, 9 pgs.
IPEA/EPO, Second Written Opinion of the International Preliminary Examining Authority, Int'l. App. No. PCT/US2015/016902, Mar. 10, 2016, European Patent Office, Rijswijk, NL, 5 pgs.

* cited by examiner

*Primary Examiner* — Leon Flores
(74) *Attorney, Agent, or Firm* — Holland & Hart LLP

(57) ABSTRACT

Methods, systems, and devices for improved acquisition of wireless communication systems or networks are described. A wireless communication device may be connected to a first network that uses a first radio access technology (RAT). When a failure occurs (e.g., lost connection), the device may attempt to acquire a cell or channel of another network that uses a second RAT. The time consumed for acquiring the channel of the second RAT may be reduced by providing a suitably prioritized list of channels. In some examples, the device may identify a channel for initial access or following a call failure based on prior successful access on that channel, or based on information provided by a server, or both.

30 Claims, 15 Drawing Sheets

FAST ACQUISITION OF SYSTEMS USING A PRIORITIZATION AND A COMBINATION OF RECENTLY FOUND SYSTEMS AND RECENTLY USED SYSTEMS

CROSS REFERENCES

The present Application for Patent claims priority to U.S. Provisional Patent Application No. 61/942,885 by Balasubramanian et al., entitled "Fast Acquisition of Systems Using a Prioritization and a Combination of Recently Found Systems and Recently Used Systems," filed Feb. 21, 2014, assigned to the assignee hereof.

BACKGROUND

The following relates generally to wireless communication, and more specifically to maintaining a wireless communication connection between wireless communication systems or networks. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

Despite continuing improvements in wireless communications, failures may still occur. For example, when establishing a VoIP (Voice over Internet Protocol) call over LTE (Long Term Evolution), delays in the transmissions of IMS (Internet Protocol (IP) Multimedia Subsystem) messages may cause the RRC (Radio Resource Control) connection for VoLTE (Voice over LTE) call setup to be released. In general, a radio link failure (RLF) may occur at any time and for various reasons, such as signal blockage, movement out of range, etc.

Although some wireless communication devices may be provisioned with multiple radios (e.g., dual radios devices such as SG-LTE (Simultaneous GSM and LTE) devices and SV-LTE (Simultaneous Voice and LTE) devices, many devices may include only a single radio. For single radio devices, an attempt may be made to acquire a cell or channel of an alternate network that uses a different radio access technology (RAT). Even with dual-radio devices, there may be situations where the device may attempt to use a different RAT when an RLF occurs in a primary or current RAT. For example, a dual-radio device may be camped on a single network to conserve power in a standby mode. If an RLF occurs in that network, the dual-radio device may attempt to acquire a cell/channel of another network that uses a different RAT. Switching to another network may cause a considerable delay in service, which may negatively impact user experience. For example, locating or tuning to a cell of the alternate network may be relatively time consuming.

SUMMARY

The described features generally relate to one or more improved systems, methods, or apparatuses for providing improved acquisition of wireless communication systems or networks. A wireless communication device may be connected to a first network that uses a first radio access technology (RAT). When a failure occurs (e.g., lost connection), the device may attempt to acquire a cell/channel of another network that uses a second RAT. The time consumed for acquiring the channel of the second RAT may be reduced by providing a suitably prioritized list of channels to acquire.

A method of wireless communication at a wireless device is described. The method may include identifying a plurality of channels in connection with a voice call operation, prioritizing a subset of the plurality of channels based at least in part on a prior voice call operation on one or more channels of the plurality, selecting a channel from the subset of channels based at least in part on the prioritization, and tuning to the selected channel.

An apparatus for wireless communication at a wireless device is described. The apparatus may include means for identifying a plurality of channels in connection with a voice call operation, means for prioritizing a subset of the plurality of channels based at least in part on a prior voice call operation on one or more channels of the plurality, means for selecting a channel from the subset of channels based at least in part on the prioritization, and means for tuning to the selected channel.

A further apparatus for wireless communication at a wireless device is described. The apparatus may include a processor, memory in electronic communication with the processor, and instructions stored in the memory operable, when executed by the processor, to cause the processor to identify a plurality of channels in connection with a voice call operation, prioritize a subset of the plurality of channels based at least in part on a prior voice call operation on one or more channels of the plurality, select a channel from the subset of channels based at least in part on the prioritization, and tune to the selected channel.

A non-transitory computer-readable medium storing code for wireless communication is described. The code may include instructions executable to identify a plurality of channels in connection with a voice call operation, prioritize a subset of the plurality of channels based at least in part on a prior voice call operation on one or more channels of the plurality, select a channel from the subset of channels based at least in part on the prioritization, and tune to the selected channel.

Some examples of the method, apparatuses, or non-transitory computer-readable medium described herein may further include querying a server for channel information and prioritizing the subset of channels based at least in part on a list of channels from the server. The plurality of channels may include channels from the list of channels. Additionally or alternatively, some examples may include receiving system information from a first system utilizing a first radio access technology. The system information may include advertised channels for a second system utilizing a second radio access technology. The plurality of channels may include channels of the second system. In some examples, selecting the channel is based at least in part on the prioritization of the subset of channels and irrespective of the advertised channels from the system information.

In some examples of the method, apparatuses, or non-transitory computer-readable medium described herein, the advertised channels are inconsistent with the prioritization of the subset of channels. In certain examples, selecting the channel includes refraining from hashing the advertised channels according to the received system information. Additionally or alternatively, some examples may include detecting, during the voice call operation, a failure of a connection over a first channel of the first system, and reconnecting the voice call operation over the selected channel.

In some examples of the method, apparatuses, or non-transitory computer-readable medium described herein, the first radio access technology may be a Long Term Evolution (LTE) radio access technology and the second radio access technology may be a 1x radio transmission technology (1xRTT) radio access technology. Additionally or alternatively, in some examples the prioritization of the subset of channels is based at least in part on most recently used (MRU) channel information.

In some examples of the method, apparatuses, or non-transitory computer-readable medium described herein, the plurality of channels includes a first channel associated with a first radio access technology and a second channel associated with a second radio access technology. Additionally or alternatively, in some examples the first radio access technology may be a Long Term Evolution (LTE) radio access technology and the second radio access technology may be a 1x radio transmission technology (1xRTT) radio access technology.

In some examples of the method, apparatuses, or non-transitory computer-readable medium described herein, the selected channel may be a previously hashed channel.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
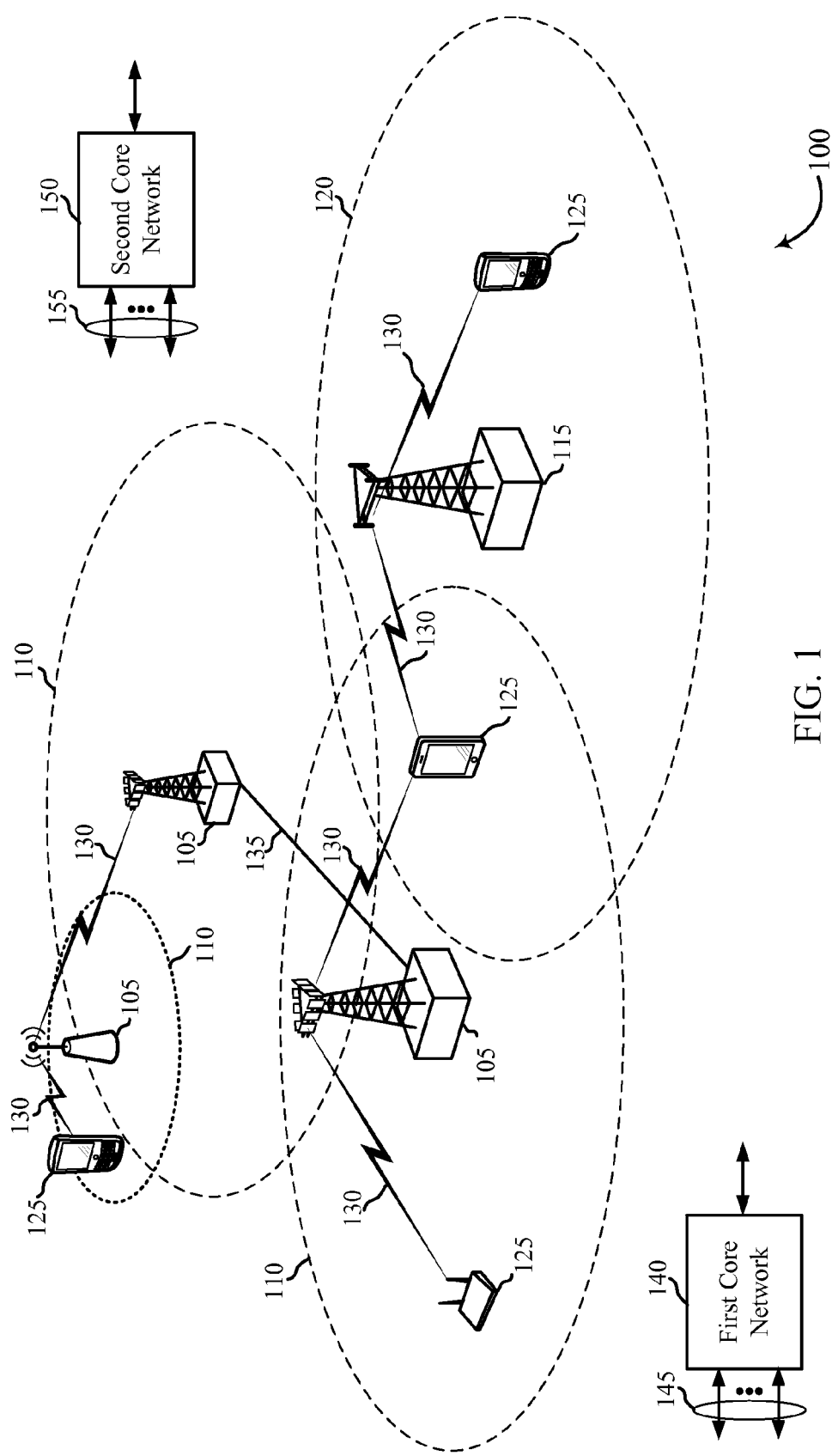
FIG. 1 shows an example wireless communication system that supports fast acquisition in accordance with the present disclosure.

Described embodiments are directed to systems, methods, and apparatuses for providing improved acquisition of wireless communication systems or networks. In one example, a wireless communication device may be configured to operate over multiple RATs, such as LTE and 1x. Although LTE and 1x are used as example RATs, it is to be understood that the present systems, methods, and apparatuses may be applied to other RATs. The device may be employed to make a call over LTE (e.g., a VoLTE call). However, if the call fails on LTE, the device may attempt to recover service using a 1x network without user intervention (e.g., acquiring a channel of the 1x network and performing a silent redial of the call). The 1x network may support a number of channels, a few of which are reserved for access procedures. Thus, before setting up a call, the device may hash the channels associated with the 1x network in search of the frequency which supports access communications for a target base station. In some cases, the device may hash frequencies based on channels listed in overhead messages (e.g., system information such as the SIB8 message) until the correct channel is found. In other examples, the device may refrain from hashing channels and instead leverage information associated with prior successful access attempts (e.g., access attempts by the device or other devices). Thus, the device may attempt to access channels of the 1x network in a suitably prioritized manner to achieve fast acquisition of the 1x network.

In various embodiments, the channels of the 1x network to be tried may be prioritized using information that is available from an MRU (most recently used) list of channels and information that is available from network advertisements. As used herein, an MRU includes channel information for channels/systems used by the wireless communication device or usable by the device (e.g., after the device registers on the particular system). The MRU is different from information for channels/systems most recently acquired by the device because such information may include channels/systems that the device has acquired but was not able to use (e.g., the device has an invalid subscription, etc.). It should also be noted that the MRU is size-limited; thus, the MRU may maintain information for only a certain number of channels/systems such that when a new entry is added to the MRU that already includes the certain number of entries, the oldest entry is dropped from the MRU.

In some examples, the device may prioritize channels based on information associated with or gained from previous access attempts. The information may be associated with access attempts performed by the prioritizing device or by other devices. The information may include data associated with successful or unsuccessful access attempts. In other words, the prioritization may be based on the history of the cell the device is attempting to access. In some cases, the information may be provided by an external entity, such as a server. The information may be provided as a result of a query from the device, or according to some other impetus—e.g., the server may periodically push information to the device. In certain examples, the server may prioritize the channels prior to communication with the device.

In some embodiments, the channels also may be prioritized using a list (e.g., history list or table) of channels that the device has previously acquired/used, with the list including cell information for each of the channels (e.g., the list of channels may be cell-specific).

In the current example, if the history table includes one or more 1x channels for the cell in which the wireless communication device is currently located, the device may first attempt to acquire the listed 1x channel or the 1x channels in the order of the list (e.g., most recently used to first used). Thus, the 1x channel(s) in the history table may be given the highest priority in this example.

If the history table does not include any 1x channels for the current cell, or if the attempt(s) to acquire such channel(s) is/are unsuccessful, the device may check to see if the most recent channel in the MRU (e.g., MRU(0)) is a 1x channel. If so, the device may attempt to acquire that channel. Thus, a channel of the desired RAT (1x) that is most recent in the MRU may be given next priority.

If the most recent channel in the MRU is not a 1x channel (or if the MRU(0) 1x channel is not successfully acquired), the device may turn to attempting to acquire one or more 1x channels that are included in both the MRU and advertised channel information (in system information blocks (SIBs); e.g., SIB-8 for 1x CS (circuit switched) network information that the device has received and stored. If a plurality of 1x channels are common to the MRU and the received/stored channel information, then the device may attempt to acquire the 1x channels in accordance with their order in the MRU (most recent common 1x channel, next most recent common 1x channel, and so on). Thus, 1x channels that have an entry in the MRU and are locally advertised (included in advertised channel information received while the device is in the current cell) may be given next priority.

If there are no 1x channels common to both the MRU and the received advertised channel information (or if the common 1x channel(s) is/are not successfully acquired), the device may then attempt to acquire one or more 1x channels included in the received advertised channel information that the device has previously hashed. Thus, 1x channels that have already been hashed by the device and that are included in the advertised channel information received by the device may be given next priority.

If there are no 1x channels that the device has previously hashed included in the received advertised channel information (or if acquisition attempt(s) of such channel(s) is/are unsuccessful), the device may attempt to acquire 1x channels in the MRU that have not yet been tried. If there are no more untried 1x channels in the MRU (or if the acquisition attempt(s) is/are not successful), then the device may attempt to acquire 1x channels included in the received advertised channel information that have yet to be tried.

The prioritization described above may allow the wireless communication device to acquire the 1x network quicker. According to this prioritization, 1x channels that are more likely to be acquired successfully by the device are given higher priority and are attempted earlier in the process. Thus, delays caused by unsuccessful acquisition attempts may be reduced.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, an example wireless communication system 100 may include user equipments (UEs) 125 that may communicate with networks utilizing different radio access technologies (RATs). The wireless communication system 100 includes a number of first base stations (or cells) 105 utilizing a first RAT, a second base station 115 utilizing a second RAT, UEs 125, a first core network 140 for the first RAT, and a second core network 150 for the second RAT. The base stations 105 or 115 may communicate with the UEs 125 under the control of a base station controller (not shown), which may be part of the first core network 140 or the second core network 150.

First base stations 105 may communicate control information or user data with the first core network 140 through backhaul links 145. Second base station 115 may communicate control information or user data with the second core network 150 through backhaul links 155. In some embodiments, the first base stations 105 may communicate, either directly or indirectly, with each other over backhaul links 135, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 130 may be a multi-carrier signal modulated according to various radio technologies. Each modulated signal may be sent on a different carrier and may carry control information (e.g., reference signals, control channels, etc.), overhead information, data, etc.

The base stations 105 and 115 may wirelessly communicate with the UE 125 via one or more base station antennas. Each of the first base station 105 sites may provide communication coverage for a respective first geographic coverage area 110. In some embodiments, base stations 105 and 115 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The first geographic coverage area 110 for a first base station 105 may be divided into sectors making up only a portion of the coverage area (not shown). Second geographic area 120 for second base station 115 may also be so divided. The wireless communication system 100 may include base stations 105 or 115 of different types (e.g., macro, micro, or pico base stations). There may be overlapping coverage areas for different RATs.

The first core network 140 may communicate with the base stations 105 via backhaul links 145 (e.g., S1, etc.). The base stations 105 may also communicate with one another (e.g., directly or indirectly) via backhaul links 135 (e.g., X2, etc.) or via backhaul links 145 (e.g., through first core network 140). The second base stations 115 may also communicate with other base stations 115 (not shown). The wireless communication system 100 may support synchronous or asynchronous operation. For synchronous operation, the base stations 105 or 115 may have similar frame timing, and transmissions from different base stations 105 or 115 may be approximately aligned in time. For asynchronous operation, the base stations 105 or 115 may have different frame timing, and transmissions from different base stations 105 or 115 may not be aligned in time. The techniques described herein may be used for either synchronous or asynchronous operations.

The UEs 125 are dispersed throughout the wireless communication system 100, and each UE 125 may be stationary or mobile. A UE 125 may be ground based or located on an airborne vehicle. A UE 125 may also be referred to as a mobile device, a mobile station, a subscriber station, a mobile unit, a subscriber unit, a wireless unit, a remote unit, a UE, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 125 may be a two-way radio, a radio cellular phone, a personal digital assistant (PDA), a wireless modem, a wireless communication device, a handheld device, a tablet computer, a laptop computer, a cordless phone, a wireless local loop (WLL) station, or the like. A UE 125 may be in simultaneous communication with the first core network 140 and the second core network 150 through a first base station 105 and a second base station 115, respectively.

The communication links 130 shown in wireless communication system 100 may include uplink (UL) or downlink (DL) transmissions from a UE 125 to base stations 105 or 115. The downlink transmissions may also be called forward link transmissions while the uplink transmissions may also be called reverse link transmissions. The communication links 130 may utilize different air interfaces of different RATs. In order to establish a communication link with a base station 105, a UE 125 may perform an access procedure. The access procedure may be an initial access procedure or a reconnection attempt after a radio link failure (RLF). The UE 125 may hash the various channels supported by the target base station 105 until the appropriate access channel is determined. In some cases, the UE 125 may avoid or refrain from hashing channels by using prioritization. For example, the order in which the UE 125 attempts to access channels may be based on a likelihood of successful access, according to the history of the access attempts at the particular base station (e.g., the success of previous access attempts). In other examples, the UE 125 may utilize a most recently used list (MRU) to prioritize channels. The MRU may include channel information for channels/systems used by the wireless communication device or usable by the device (e.g., after the device registers on the particular system). Additionally or alternatively, the UE 125 may prioritize channels according to information associated with a history table of channels that the device has previously acquired or used.

A UE 125 may be configured to receive system information (e.g., master information block (MIB) and system information blocks (SIBs)) from a base station 105 that enables the UE 125 to establish a connection. In some cases, the system information may include advertised channels (e.g., channels that the associated base station 105 supports). The system information may be sent over a first radio access technology (RAT) (e.g., LTE) and include information regarding supported channels for a second radio access technology (e.g., 1xRTT). In some instances, the UE 125 may select a channel for access based on a prioritization scheme and irrespective of the list of channels provided by the system information. That is, the UE 125 may refrain from hashing the advertised channels.

In one example, respective base station controllers (not shown) may be coupled to a set of first base stations 105 or to the second base station 115, and may provide coordination and control for the respective base stations 105/115. The respective controller(s) may communicate with the first base stations 105 via a backhaul (e.g., the respective first core network 140) and with the second base station 115 via a backhaul (e.g., the respective second core network 150).

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels. The control plane may include a radio resource control (RRC) protocol layer, which may be used in establishing and maintaining connections over the air interface including configuring radio bearers, mobility functions, security functions, etc.

Figure 2:
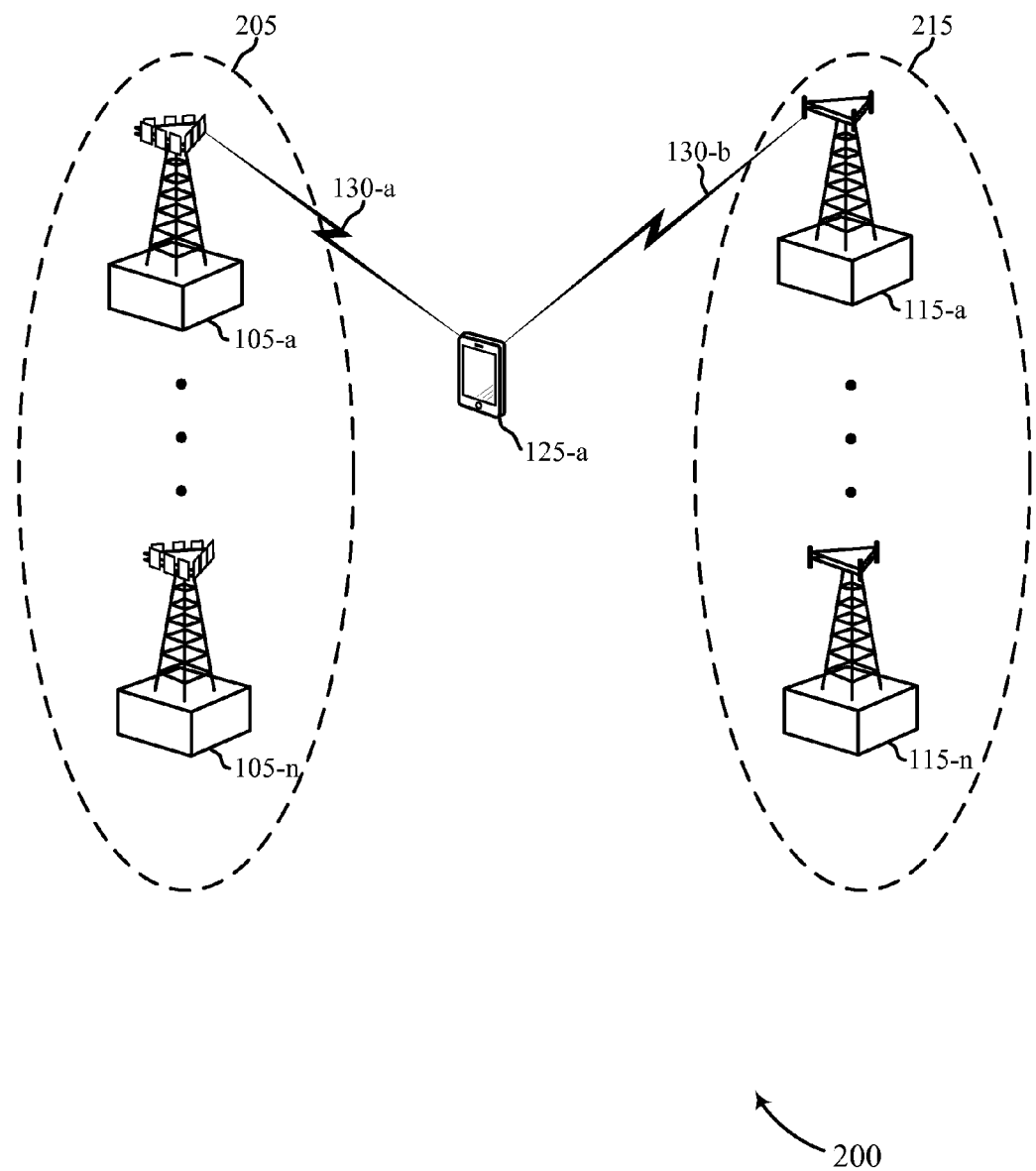
FIG. 2 shows an example system that supports fast acquisition in accordance with the present disclosure.

Turning now to FIG. 2, an example wireless communication system 200 may include a UE 125-a that may communicate with networks utilizing different RATs. In some embodiments, the system 200 may be considered to be a simplified illustration of the system 100 of FIG. 1. The system 200 may include a number of first base stations 105-a through 105-n associated with a first network 205 that uses a first RAT and a number of second base stations 115-a through 105-n associated with a second network 215 that uses a second RAT different from the first RAT. The UE 125-a may establish and maintain a first connection 130-a with the first base station 105-a. As appropriate or desired, the UE 125-a may establish and maintain a second connection 130-b with the second base station 115-a to use the second network 215 instead of the first network 205.

In some embodiments, the first network 205 is an LTE network implementing UTRA/E-UTRA (Universal Terrestrial Radio Access Network/Evolved UTRA) air interfaces (e.g., LTE/LTE-A) and the second network is a 1xRTT (single carrier Radio Transmission Technology) network implementing CDMA based air interfaces (e.g., cellular, PCS (personal communication service)). It should be understood, however, that other networks may be employed for either of the networks, in some examples.

Prior to establishing connection 130-a with the first base station 105-a, the UE 125-a may attempt to perform an access procedure over one of the channels supported by the first base station 105-a. The UE 125-a may select the channel according to a prioritization scheme which may enable the UE 125-a to skip access attempts on channels that would have otherwise been attempted. For example, the UE 125-a may prioritize the available channels according to access history information associated with each channel. For instance, channels with high access success rates may receive a higher priority than channels with low access success rates. The access information may be associated with the UE 125-a or with other UEs 125. In some cases, the UE 125-a may request (e.g., query) a server (e.g., located at first base station 105-a) to provide cell history information, such as access channel information. In other cases, the UE 125-a may receive cell history information unassociated with a request (e.g., the server may send the information independently). Based on the cell information and prioritization, the UE 125-a may select a channel and attempt an access procedure.

Thus, a UE 125 may use cell history-based prioritization to perform initial access and establish a communication link with a base station 105. For example, after a successful access attempt the UE 125-a may be in an LTE connected mode (e.g., RRC connected) with base station 105-a via the first connection 130-a. If the UE 125-a experiences an out-of-service (OOS) condition (e.g., an RLF occurs) for the first connection 130-a, the UE 125-a may attempt to recover service on the first network 205 using an RLF procedure. Conventionally, the UE 125-a may attempt to perform handover (e.g., backward handover, RLF handover, forward handover, etc.) to a target base station 105 identified by the source base station (e.g., in a neighbor cell relation (NCR) list, etc.) as a handover candidate.

However, if no handover candidates have been identified or if attempts to perform RLF-based handover fail, the UE 125-a may attempt to recover service on the second network 215 (e.g., the UE 125-a may attempt to connect to base station 115-a). The UE 125-a may attempt to access eNB 115-a by utilizing an access channel prioritization scheme such as described above.

In some embodiments, the different aspects of systems 100 and 200, such as the UEs 125, may be configured for improving recovery of service on the second network 215 after an OOS condition. In embodiments, the UE 125-a attempts to reconnect by establishing a connection (acquiring) a channel of the second network 215 in a prioritized manner so that the time required for the recovery is reduced or minimized. The channels of the second network 215 may be prioritized by the UE 125-a using available information. Such available information may include a history table that includes information for all channels that the UE 125-a has previously used, an MRU that includes information for a certain number of channels that the UE 125-a has most recently used (e.g., a list of recently used channels in order of their use, most recent being first for example), advertised channel information received from the first network 205 (e.g., SIBs for LTE), cell access history information, a geographical list of channel information associated with the MRU channel information (e.g., an Idle GEO List including information for idle MRU channels), and an acquisition table that includes information for provisioned channels available for use.

For example, the UE 125-a in LTE cell A may have a history table with entries of 1x systems/bands/channels. The UE 125-a may be using a channel of LTE cell B, a neighbor of cell A (which may be determined in any suitable manner), for a call. When the call fails in cell B, the UE 125-a may use the history table entries for cell A to attempt acquisition of a 1x channel (e.g., scanning 1x channels associated with the history table entries for cell A). In some examples, the UE 125-a may use prioritization to select which channel to attempt access.

When the UE 125-a is out-of-coverage of the system on which the UE 125-a is camped, an Idle GEO List may be created to help the UE 125-a quickly discover and camp on a valid system. The Idle GEO list may be formed from the systems that are in the same geographic location as the system in which the UE 125-a was most recently camped. The Idle GEO List may include channels (and channel information, such as system type, system band, etc.) associated with the geographical location of the most recent system on which the UE 125-a was idling. The Idle GEO list is maintained independently of the MRU list.

Figure 3:
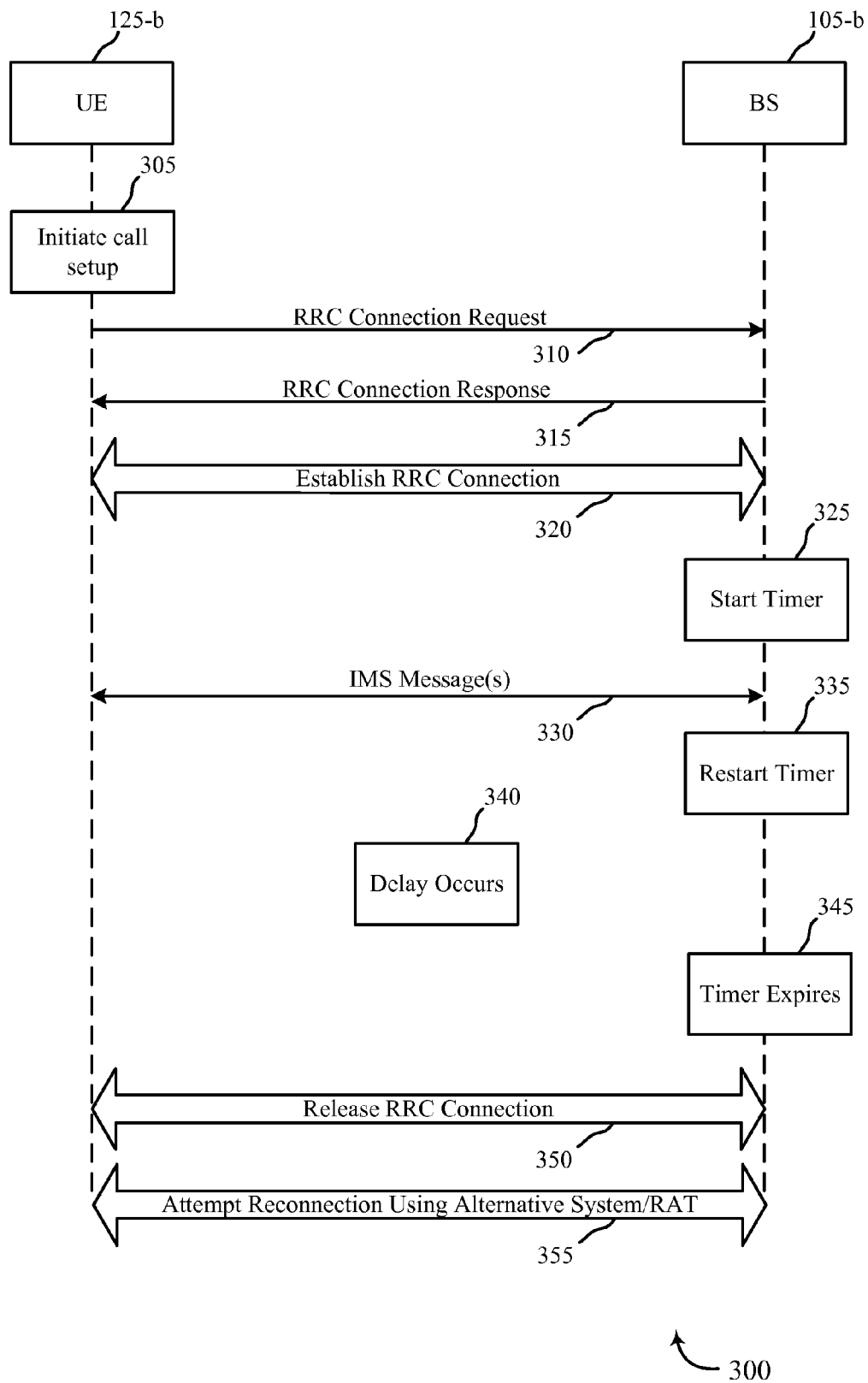
FIG. 3 shows a communication flow within a system that supports fast acquisition in accordance with the present disclosure.

In FIG. 3, a communication flow diagram 300 according to one example of a call setup procedure (e.g., for VoLTE) is shown. In this example, a UE 125-b may be operated to initiate a call setup at block 305. For example, a user may dial a number or select a contact to call using the UE 125-b. The UE 125-b may send an RRC connection request 310 to a base station (BS) 105-b as part of the call setup procedure. In return, the base station 105-b may send an RRC connection response 315 to the UE 125-b. Although a simplified request and response is shown, it should be understood that various communications or negotiations between the UE 125-b and the base station 105-b may occur to establish an RRC connection 320. The base station 105-b may be an example of the base stations 105 illustrated in FIG. 1. The UE 125-b may be an example of the UEs 125 illustrated in FIG. 1.

Once the RRC connection has been established between the base station 105-b and the UE 125-b, the base station 105-b may start an RRC connection inactivity timer at block 325. The base station 105-b may then monitor the call setup procedure for messages associated with the call setup procedure. In the case of VoLTE call setup, the messages may be IMS (IP Multimedia Subsystem) messages 330. Such messages sent by the UE 125-b and received by the base station 105-b or sent by the base station 105-b and received by the UE 125-b may indicate that the call setup procedure is progressing. As such, if the base station 105-b sends or receives such a message, the base station 105-b may restart the timer at block 335 to maintain the RRC connection for the call setup procedure (e.g., to prevent release of the RRC connection upon lapse or expiration of the timer).

Although block 335 indicates that the timer is restarted, it should be understood that the timer may be otherwise extended so as not to expire after elapse of the original period of the timer. For example, rather than restarting the timer, additional time may be added to the timer each time a call setup message is sent or received, as appropriate or desired. In either case, the timer may be restarted/extended as long as the call setup procedure is progressing.

However, if a sufficient delay occurs between call setup messages at block 340, the timer may expire at block 345. For example, if a call setup message is sent by the base station 105-b but is not received by the UE 125-b for some reason (channel congestion, transport delay, etc.), or vice versa, both the base station 105-b and the UE 125-b may be waiting on each other for a further message. In such case, sufficient time may pass before either the base station 105-b or the UE 125-b attempts to send another call setup message and the timer may expire.

The base station 105-b may be configured to release the RRC connection 350, or communicate with the UE 125-b to release the connection, if the timer expires. At this point, the UE 125-b will need to re-establish a connection to continue with the desired call setup, or to restart the call setup procedure. Thus, it may be desirable to attempt recovery using an alternative system/RAT 355. Details of such a recovery process and aspects associated therewith are described further below.

It should be understood that other operations (e.g., messages, etc.) may occur within the flow illustrated in FIG. 3. For example, the UE 125-b may optionally send a message to the network (LTE in this example) to suspend bearers when switching to an alternate system (e.g., an Extended Service Request message). Thus, the communication flow diagram 300 should be understood as being for illustrative purposes only.

Figure 4A:
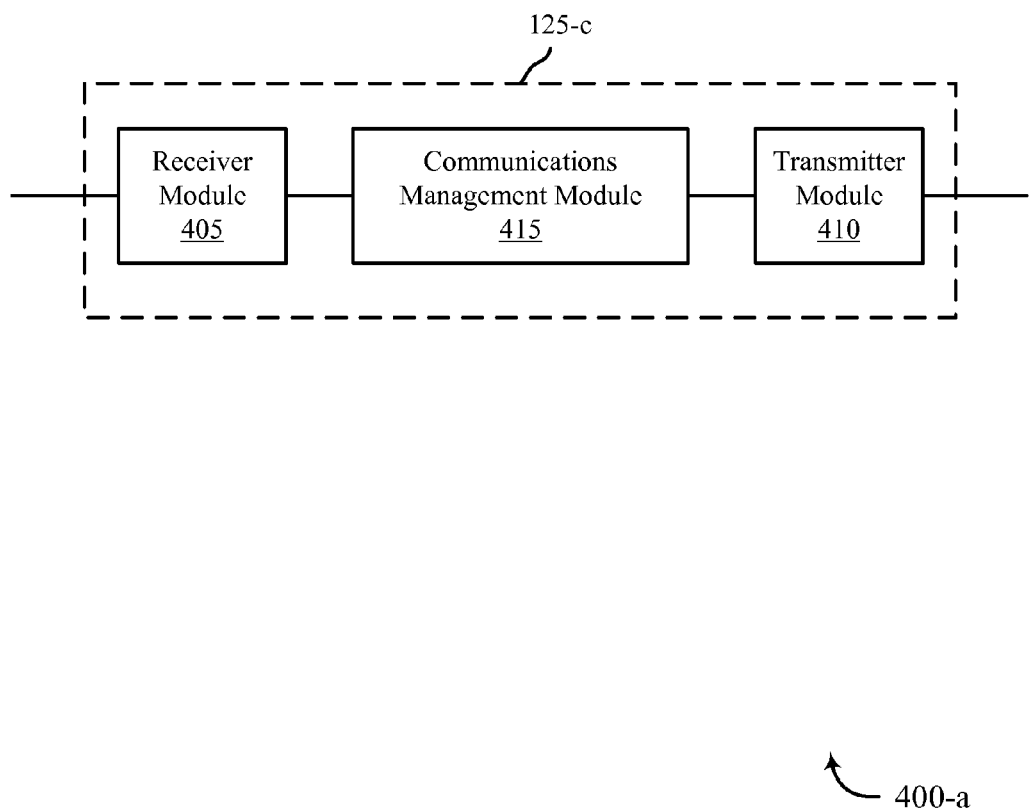
FIG. 4A shows a block diagram of an exemplary device that supports fast acquisition in accordance with the present disclosure.

FIG. 4A shows a block diagram 400-a of an example of a user equipment (UE) 125-c. The UE 125-c may be an example of one or more aspects of a UE 125 described with reference to FIG. 1, 2 or 3. The UE 125-c may include a receiver module 405, a transmitter module 410 and a communications management module 415. The UE 125-c may also include a processor (not shown), which may be part of the communications management module, for example. Each of these components may be in communication with each other.

The receiver module 405 may receive information such as packets, user data, or control information including synchronization and pilot signals. The received information may be demodulated, descrambled, de-interleaved, or decoded. The information may be passed on to the communications management module 415, and to other components of the UE 125-c as appropriate or desired.

The receiver module 405 may include a single receiver or multiple receivers. For example, the receiver module 405 may include N receive antennas and R RF chains (not shown), where R is generally less than or equal to N. Each RF chain may include an RF module and an analog-to-digital converter (ADC). During operation, signals received by a receive antenna may be provided to an input of an RF chain. At the RF chain, the signals are processed (e.g., amplified, downconverted, filtered, etc.) by an RF module and digitized by the ADC. The output of the RF chain may be provided to the demodulator for further processing. The demodulator may combine signals received from multiple antennas using receive diversity techniques to increase the SINR of the received signals. The demodulator may use a suitable signal combining technique such as equal gain combining, maximum ratio combining (MRC), and the like. The demodulator and RF chains may use interference cancellation techniques to further provide interference cancellation or suppression (e.g., interference rejection combining, successive interference cancellation, and the like).

The transmitter module 410 may transmit information such as packets, user data, or control information including synchronization and pilot signals. The transmitted information may be modulated, scrambled, interleaved, or coded. The information may be received from the communications management module 415, and from other components of the UE 125-c as appropriate or desired. In some embodiments, the transmitter module 410 may be collocated with the receiver module 405 in a transceiver module (not shown). The transmitter module 410 may include a single antenna, or it may include a plurality of antennas. The communications management module 415 may employ the transmitter module 410 and the receiver module 405 (or a transceiver module) to perform various wireless communications (including channel acquisition) by communicating with a base station as described herein.

Further, the communications management module 415 may employ the transmitter module 410 and the receiver module 405 to implement aspects of a prioritization mechanism as described herein. For example, the communications management module 415 may identify a plurality of channels that support voice call operation. In some cases, the plurality of channels include a first channel associated with a first RAT and a second channel associated with a second RAT. The communications management module 415 may be configured to request and receive channel information from a server or receive network advertised information (e.g., broadcast advertisements from a base station). In some embodiments, the communications management module 415 may also be configured to maintain a history table, an MRU and an Idle GEO List. Further, the communications management module 415 also may access various sources of channel information stored on the UE 125-c to implement a prioritization mechanism as described herein. As such, the communications management module 415 may determine the priority (order) for attempting to acquire channels of the alternate/second network for recovery of service upon failure on the first (e.g., primary) network, as described herein. For example, the communications management module 415 may prioritize channels based on prior successful. Accordingly, the communications management module 415 may select a channel based on the prioritization. In some cases, the selected channel may include a previously hashed channel. The prioritization may be performed irrespective of system information, such as advertised channels, and the result of the prioritization may differ from channels identified in the system information. The communications management module 415 may also tune to a channel selected based on the prioritization. Thus, the communications management module 415, either alone or in combination with the receiver module 405 or the transmitter module 410, may be means for performing the various operations or functions described herein (e.g., detecting, identifying, acquiring, connecting/reconnecting, prioritizing, updating, removing, querying, etc.).

Figure 4B:
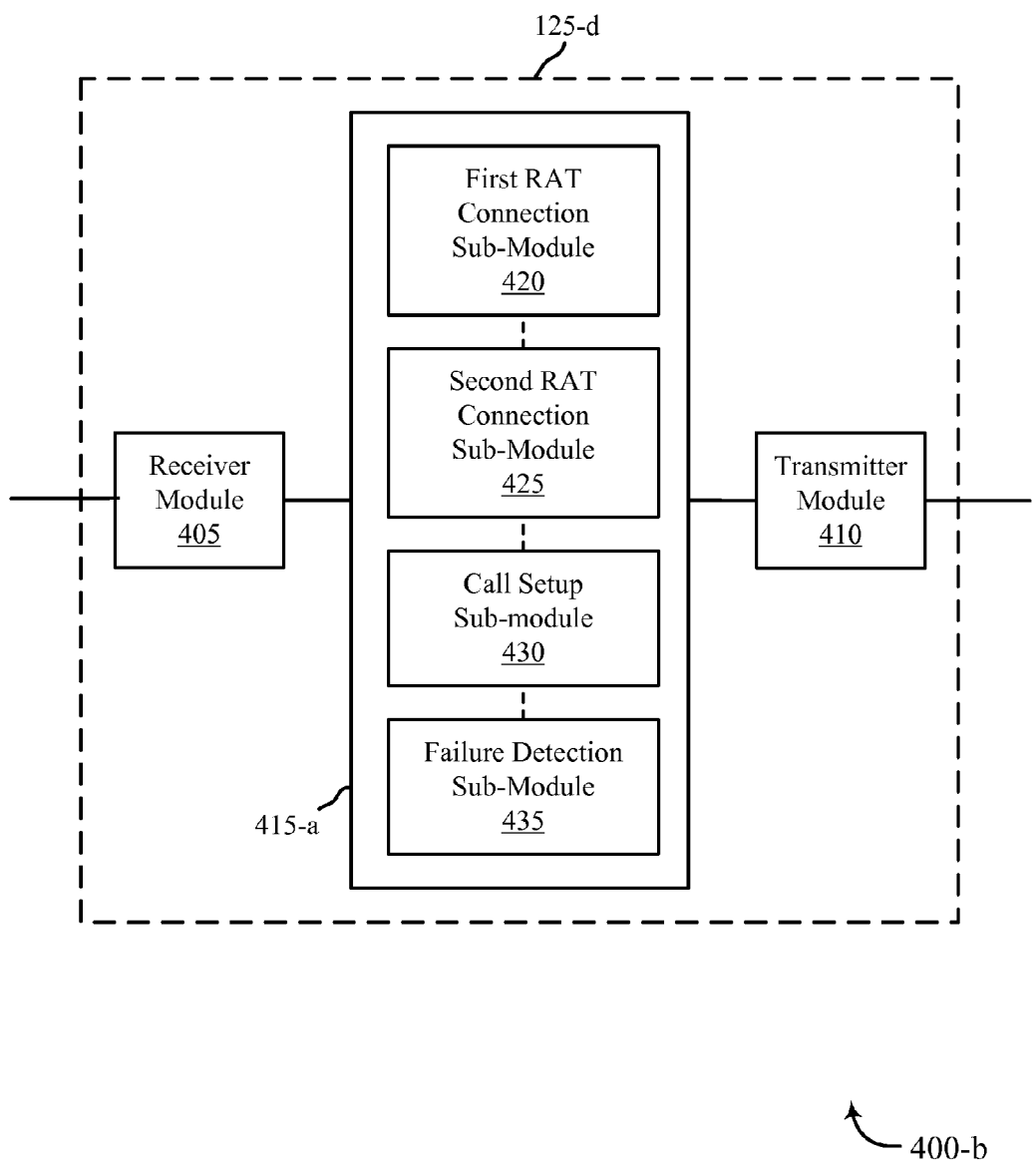
FIG. 4B shows a block diagram of an exemplary device that supports fast acquisition in accordance with the present disclosure.

FIG. 4B shows a block diagram 400-b of an example of a UE 125-d. The UE 125-d may be an example of one or more aspects of a UE 125 described with reference to FIG. 1, 2, 3 or 4A. The UE 125-d may include a receiver module 405, a transmitter module 410 and a communications management module 415-a. The UE 125-d may also include a processor (not shown), which may be part of the communications management module, for example. Each of these components may be in communication with each other.

The receiver module 405 and the transmitter module 410 may be configured and may be employed as described above with respect to FIG. 4A. The communications management module 415-a may be configured and may implement operations as described above with respect to the communications management module 415 of FIG. 4A.

Further, as illustrated in FIG. 4B, the communications management module 415-a may include a first RAT connection sub-module 420 for acquiring a channel of a network using the first RAT and maintaining a connection therewith. In some cases, the first RAT connection sub-module 420 may receive system information from a system utilizing the first RAT. The system information may include advertised channels for a second system utilizing a second RAT. In some examples, the plurality of channels may include channels from the second system. The communications management module 415-a also may include a second RAT connection sub-module 425 for acquiring a channel of a network using the second RAT and maintaining a connection therewith. In some cases, the first RAT includes an LTE radio access technology and the second RAT includes a 1x radio transmission technology (1xRTT) radio access technology.

In some embodiments, the communications management module 415-a may include a call setup sub-module 430 for performing a call (e.g., VoLTE) setup procedure, including requests, responses and other communications (e.g., IMS messages). In some cases, the call setup sub-module may be for querying a server for channel information. The call setup sub-module 430 may, for instance, refrain from hashing advertised channels according to received system information. In certain examples, the call setup sub-module 430 may reconnect a call over a selected channel. The call set up procedure may be any known or hereafter developed procedure by which a wireless communications device may establish voice communications.

As shown in FIG. 4B, the communications management module 415-a also may include a failure detection sub-module 435 that is configured to detect a failure (e.g., RLF) of a connection established with a channel of a network using the first RAT. For example, the failure detection sub-module 435 may detect, during a call, a failure of connection over a channel of a first system that operates according to a first RAT.

As appropriate or desired, the failure detection sub-module 435 also may be configured to detect a failure of a connection established with a channel of a network using the second RAT (e.g., to facilitate switching to the first RAT or a third RAT).

Figure 4C:
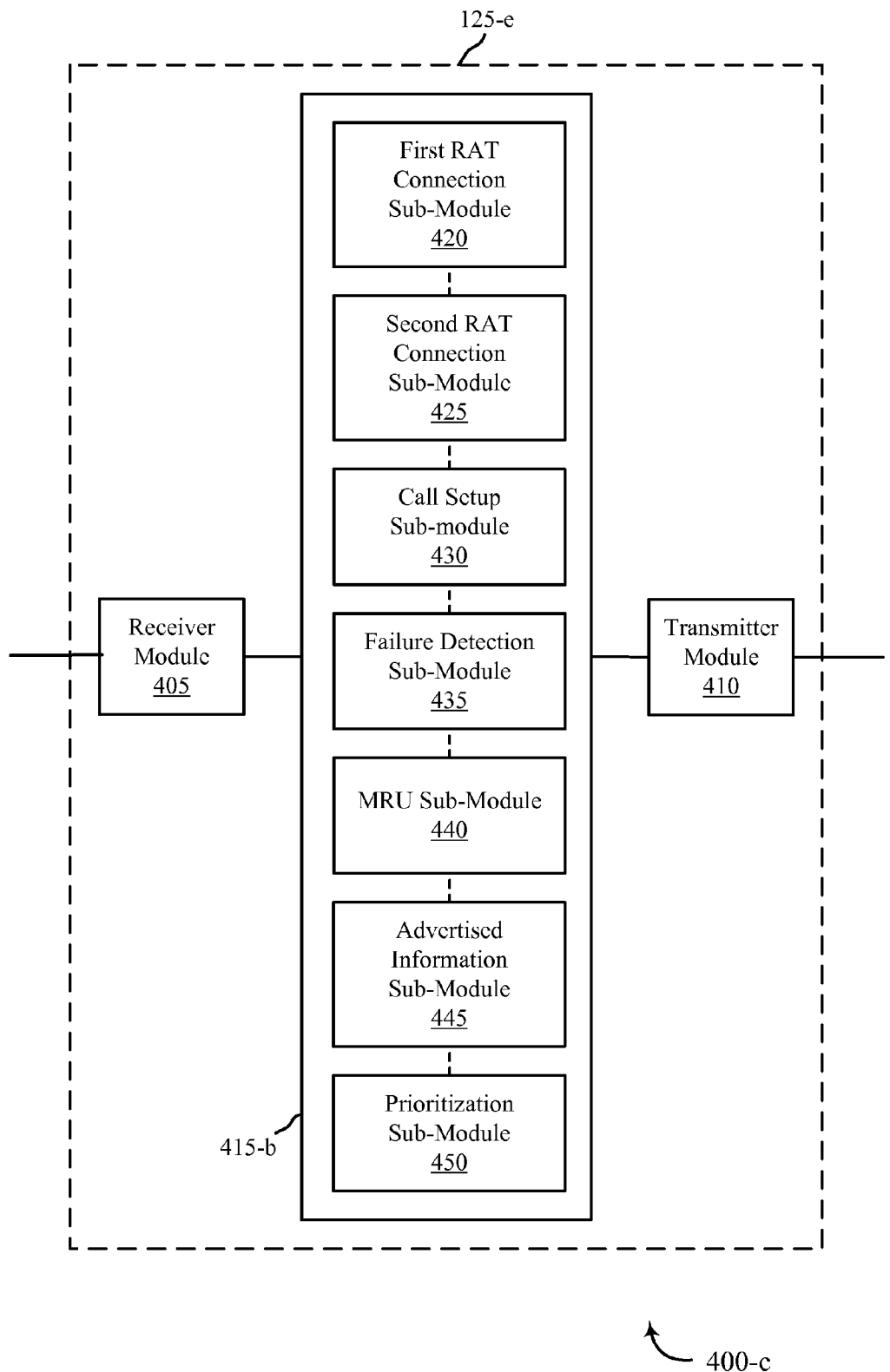
FIG. 4C shows a block diagram of an exemplary device that supports fast acquisition in accordance with the present disclosure.

FIG. 4C shows a block diagram 400-c of an example of a UE 125-e. The UE 125-e may be an example of one or more aspects of a UE 125 described with reference to FIGS. 1, 2, 3, 4A or 4B. The UE 125-e may include a receiver module 405, a transmitter module 410 and a communications management module 415-b. The UE 125-e may also include a processor (not shown), which may be part of the communications management module, for example. Each of these components may be in communication with each other.

The receiver module 405 and the transmitter module 410 may be configured and may be employed as described above with respect to FIG. 4A. The communications management module 415-b may be configured and may implement operations as described above with respect to the communications management module 415 of FIG. 4A or as described above with respect to the communications management module 415-a of FIG. 4B. Thus, in some embodiments the communications management module 415-b may include a first RAT connection sub-module 420, a second RAT connection sub-module 425, a call setup sub-module 430 and a failure detection sub-module 435, each of which may be configured and may implement operations as described above with respect to FIG. 4B.

Further, the communications management module 415-b may include an MRU sub-module 440. The MRU sub-module 440 may be configured or otherwise controlled by the communications management module 415-b maintain an MRU (e.g., keep the list of most recently used channels up to date). Thus, the MRU sub-module 440 may communicate with the receiver module 405 or the transmitter module 410 to obtain information on channels that are used by the UE 125-e.

The communications management module 415-b also may include an advertised information sub-module 445. The advertised information sub-module 445 may be configured or otherwise controlled by the communications management module 415-b to maintain channel information received from a network (e.g., keep the information up-to-date as the UE 125-e is moved between cells that may broadcast different channel information). Thus, the advertised information sub-module 445 may communicate with the receiver module 405 to obtain information on channels that are available for use by the UE 125-e at the current location of the UE 125-e. Alternatively or additionally, the advertised information sub-module 445 may be configured or otherwise controlled by the communications management module 415-b to query a server to obtain information on channels that are available for use by the UE 125-e at the current location of the UE 125-e, and may communicate with both the receiver module 405 and the transmitter module 410 to do so.

The communications management module 415-b also may include a prioritization sub-module 450. The prioritization sub-module 450 may be configured or otherwise controlled by the communications management module 415-b to prioritize channels as described herein. The prioritization sub-module 450 may prioritize channels per network or RAT basis using channel information from various sources as described herein. The prioritization sub-module may, in some embodiments, prioritize channels based at least in part on MRU channel information. For example, the prioritization sub-module 450 may communicate with MRU sub-module 440 or the advertised information sub-module 445 to obtain channel information. In some embodiments, the MRU sub-module 440 or the advertised information sub-module 445 may be configured to store their respective channel information in memory (not shown) of the UE 125-e. In such case, the prioritization sub-module 450 may access the memory to obtain such channel information. In some embodiments, the prioritization sub-module 450 may provide channels to the second RAT connection sub-module 425, for example, in a prioritized order until a connection is successfully established to recover service from a failure on the first network/RAT. Alternatively, the prioritization sub-module 450 may generate, store or update a prioritized list of channels, which the communications management module 415-b (or the second RAT connection sub-module 425, for example) may access for attempting acquisition of the channels in the order specified by the prioritized list.

Figure 5:
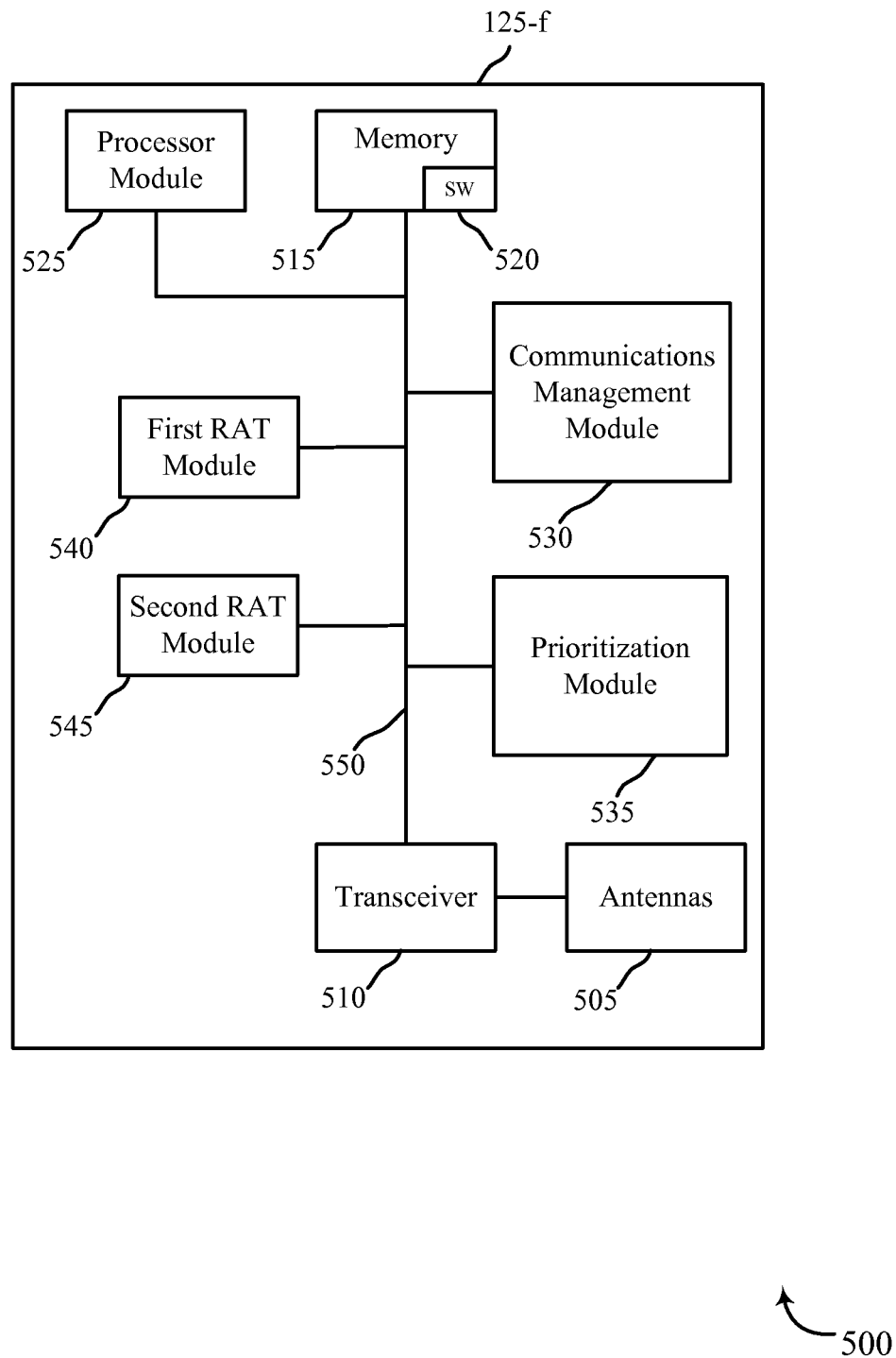
FIG. 5 shows a block diagram of an exemplary device that supports fast acquisition in accordance with the present disclosure.

FIG. 5 shows a block diagram 500 of a configuration for implementing a UE 125-f. The UE 125-f may be an example of one or more aspects of a UE 125 described with reference to FIGS. 1, 2, 3, 4A, 4B or 4C. The UE 125-f may include one or more antennas 505 configured to receive and transmit wireless signals in cooperation with one or more transceiver modules 510. The UE 125-f may further include a communications management module 530, a prioritization module 535, a first RAT module 540, a second RAT module 545, a processor module 525, and a memory 515, each of which may be in communication, directly or indirectly, with each other (e.g., over one or more buses 550).

The transceiver module 510 may be configured to communicate, via the antenna(s) 505, with other UEs or base stations of one or more networks under control by the communications management module 530. Thus, the transceiver module 510 or transceiver may be means for sending, transmitting, receiving or obtaining, alone or in combination with the various other modules of the UE 125-f or the antenna(s) 505. The transceiver module 510 may include a modem configured to modulate the packets and provide the modulated packets to the antenna(s) 505 for transmission, and to demodulate packets received from the antenna(s) 505.

The memory 515 may include random access memory (RAM) and read-only memory (ROM). The memory 515 may also store computer-readable, computer-executable software code 520 containing instructions that are configured to, when executed, cause the processor module 525 to perform various functions described herein (e.g., call setup procedure, initiating, establishing, monitoring, detecting, determining, starting, restarting, setting, incrementing, resetting, sending/transmitting, receiving, controlling, etc.). Alternatively, the software code 520 may not be directly executable by the processor module 525, but may be configured to cause a computer (e.g., when compiled and executed) to perform functions described herein. Thus, the processor module 525 or processor may be means for initiating, establishing, starting, transmitting, monitoring restarting, setting, incrementing, resetting, determining, etc., alone or in combination with the memory 515 and the software code 520. The processor module 525 may include an intelligent hardware device (e.g., a central processing unit (CPU), a microcontroller, an application-specific integrated circuit (ASIC), etc.).

The prioritization module 535 may be configured to perform various operations to prioritize channels or provide a prioritized list of channels on a per network/RAT basis as described herein. The prioritization module 535 may perform such operations in conjunction with the transceiver module 510 and the antenna(s) 505. Further, the prioritization module 535 may operate to under the control of the communications management module 530 or the processor module 525.

The first RAT module 540 and the second RAT module 545, respectively, may be any known or hereafter developed hardware or software that is capable of providing the functionality thereof as described herein. The first RAT module 540 and the second RAT module 545 may perform various operations in conjunction with the communications management module 530 to establish and maintain connections using the respective RATs. Further, the first RAT module 540 or the second RAT module 545 may be configured to communicate with the prioritization module 535 (or access the memory) to successively obtain channels for attempting acquisition in the prioritized order.

The communications management module 530 may be an example of the communications management modules 415 of FIGS. 4A, 4B, or 4C, and may implement the functionality for these modules described above. Although the communications management module 530 is shown separately, the functionality of the communications management module 530 may be implemented as a component of the transceiver module 510, as a computer program product, or as one or more controller elements of the processor module 525. Similarly, the prioritization module 535 may be implemented as components of the transceiver module 510, as a computer program product, or as one or more controller elements of the processor module 525.

The components of the UEs 125-c, 125-d, 125-e, or 125-f may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UEs 125-c, 125-d, 125-e, or 125-f.

Figure 6:
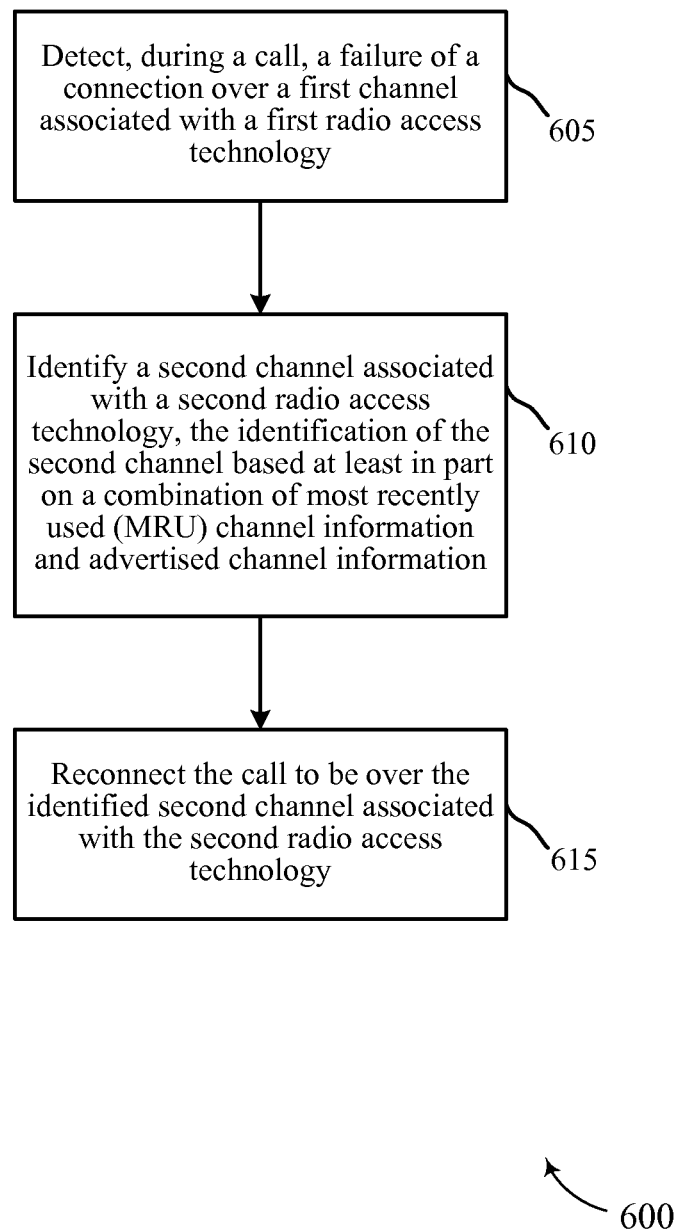
FIG. 6 illustrates a method for wireless communication in accordance with the present disclosure.

FIG. 6 is a flowchart of a method 600 for wireless communications using a wireless communication device. For clarity, the method 600 is described below with reference to aspects of one or more of the UEs 125 described with reference to FIGS. 1, 2, 3, 4A, 4B, 4C or 5. In one implementation, a UE 125 or a processor module thereof may execute one or more sets of codes to control the functional elements of the UE 125 to perform the functions described below.

The method 600 may be employed for recovering service when a failure occurs in an established connection, for example during a call (e.g., VoLTE), over a first channel associated with a first radio access technology (RAT). Thus, at block 605, the UE 125 may detect a failure of the connection over the first channel of the first RAT (e.g., LTE).

Next, at block 610, the UE 125 may identify a second channel associated with a second RAT. The identification of the second channel may be performed using a combination of most recently used (MRU) channel information maintained by the UE 125 and advertised channel information received by the UE 125. In such a manner, the UE 125 may successively attempt to acquire channels of the second RAT in a prioritized order until acquisition of a channel is successful (e.g., the second channel is identified).

Then, at block 615, the UE 125 may reconnect the call using the identified second channel associated with the second RAT. Thus, the UE 125 may recover service using the second RAT. Using a combination of MRU channel information and advertised channel information may allow the UE 125 to acquire an alternate system/network that uses the second RAT in a more efficient manner, which may reduce the time required for the recovery of service.

The combination of MRU channel information and advertised channel information may be implemented, such as described herein, so as to reduce or even avoid problems or limitations that may be encountered using either MRU channel information or advertised channel information, or both, to identify the second channel to use for service recovery.

For example, when a device relies on the MRU channel information for selecting channels to attempt recovery, the MRU may not include an entry for a desired alternate system/network. This may be the case where a system using a first RAT (e.g., LTE) may have sufficient coverage so that the wireless communication device has not accessed a channel of an alternate system using a second RAT (e.g., 1x) recently enough to be included in the MRU. Another problem with relying on the MRU is that the information in the MRU is not cell specific. As such, even when the MRU does include one or more entries for a desired alternate system/network, the entry or entries may not be available for the current location of the wireless communication device (e.g., the device may have moved out of range of a recently accessed channel of the alternate system).

When a device relies on network advertised channel information the information may not be accurate or complete. The information may be inaccurate in terms of geographical availability of channels or other channel specifics (e.g., frequency). Further, the information may not include all channels that are available for a desired alternate system/network. For example, if five channels are available for 1x and SIB-8 includes only three of the channels, the wireless communication device may hash to one of the included three channels. However, when the 1x system is found, the device may have to re-hash to one of the two channels not included in the SIB-8 information. Thus, reliance on network advertisements may result in a delay penalty—taking more time to acquire a suitable channel of the desired alternate system. Moreover, the overhead cost of ensuring that all network advertised channel information is accurate, complete or up to date is prohibitive.

These problems (and other potential problems) with reliance on the MRU and reliance on the network advertised channel information cannot be resolved merely by employing both MRU channel information and advertised channel information. Thus, as described herein, a combination of the channel information in the MRU and the advertised channel information is employed in various embodiments.

Figure 7A:
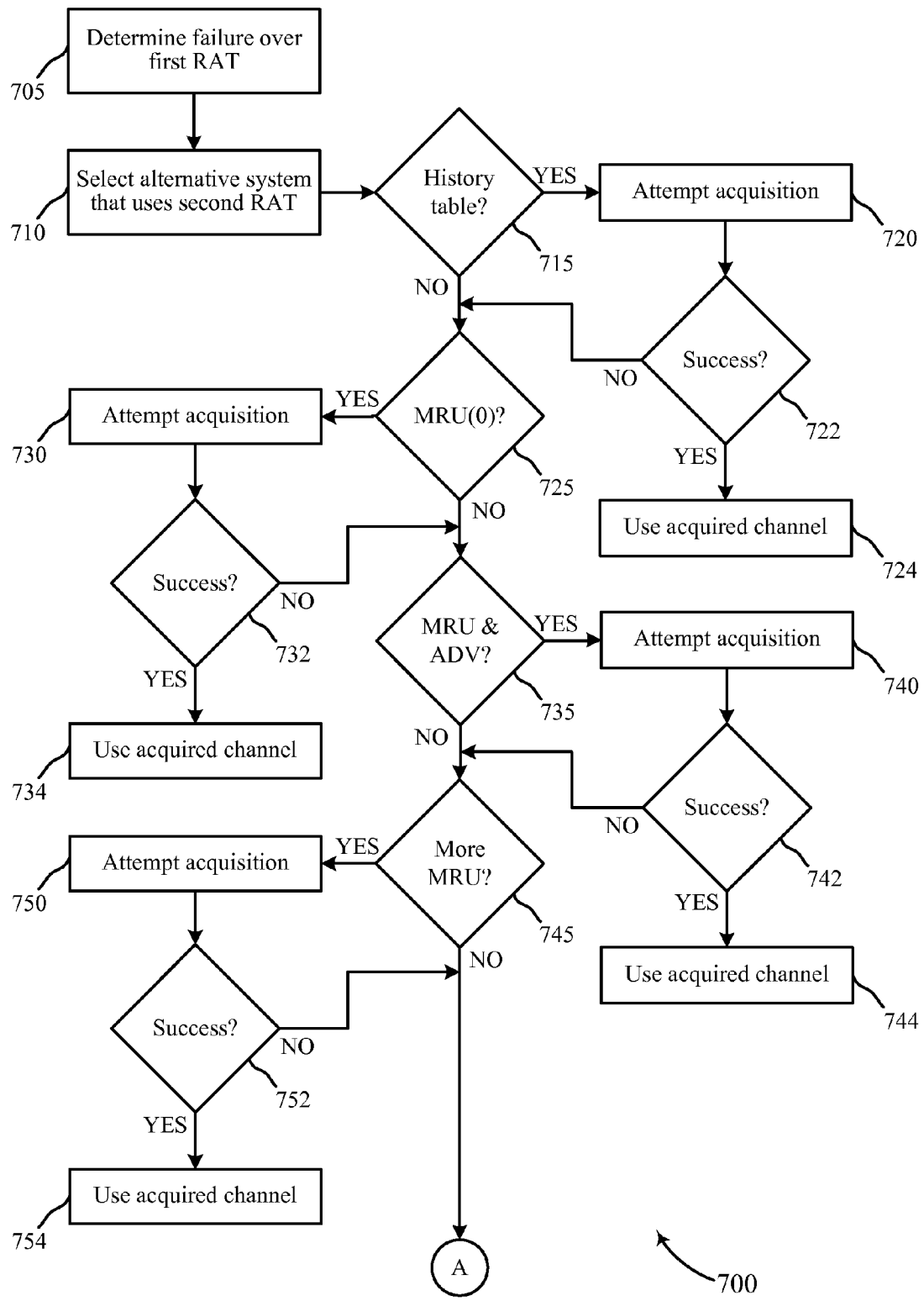
FIGS. 7A and 7B illustrate a method for wireless communication in accordance with the present disclosure.
Figure 7B:
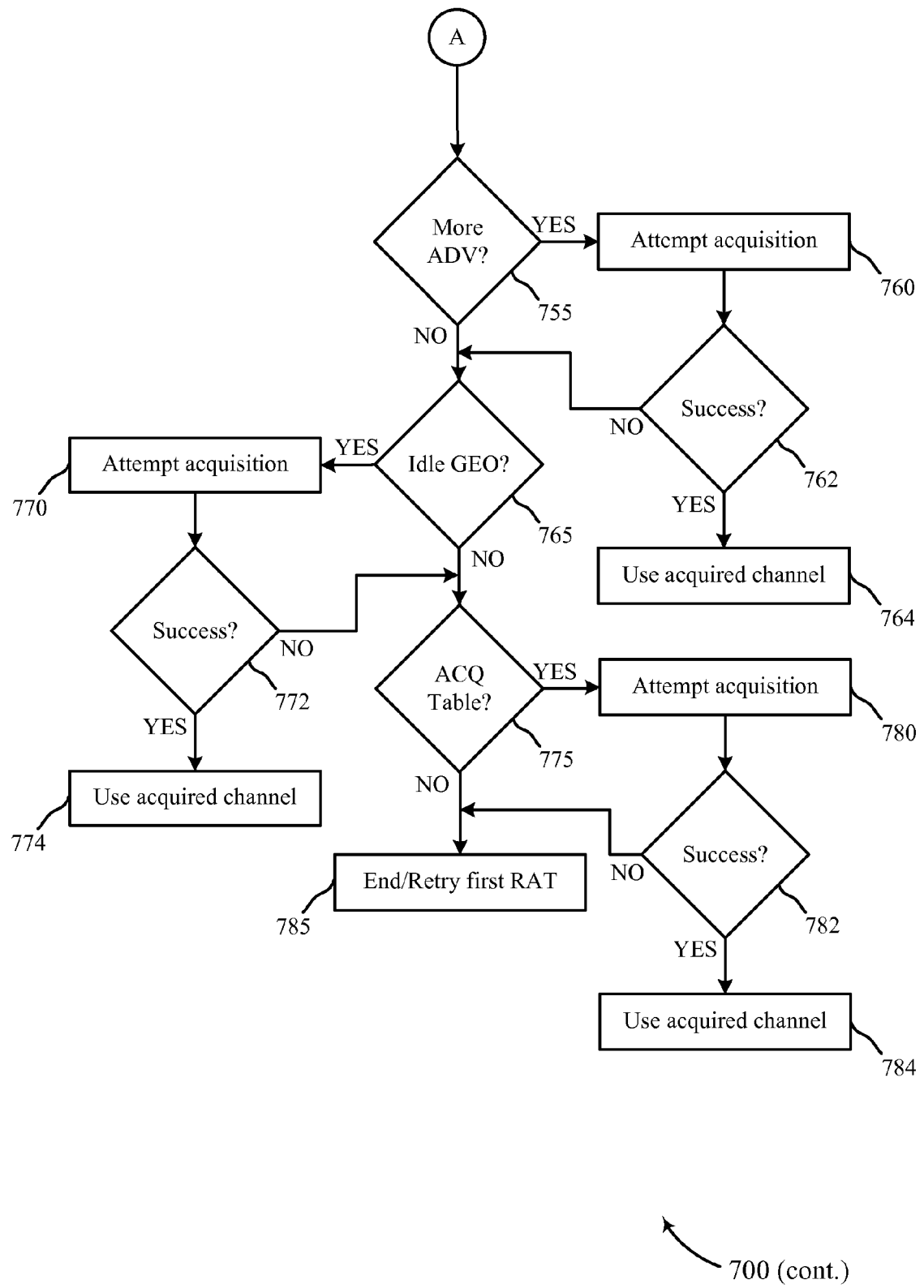

FIGS. 7A and 7B are a flowchart of another method 700 for wireless communications using a wireless communication device. For clarity, the method 700 is described below with reference to aspects of one or more of the UEs 125 described with reference to FIGS. 1, 2, 3, 4A, 4B, 4C or 5. In one implementation, a UE 125 a processor module thereof may execute one or more sets of codes to control the functional elements of the UE 125 to perform the functions described below.

At block 705 in FIG. 7A, the UE 125 may determine that a failure of a connection over a first channel of a first RAT has occurred. Next, at block 710, the UE 125 may select an alternative system that uses a second RAT, which may be used for service recovery. In some embodiments, the alternative system may be determined, for example, based on the first RAT, the type of communication service to be restored, or any other suitable factors, conditions or parameters. In some embodiments, the UE 125 may be configured to operate with only one alternative system/RAT. In such case, block 710 may be omitted.

The UE 125 may then proceed to obtain channels of the (selected) second RAT in a prioritized manner for attempting acquisition thereof. At block 715, the UE 125 may determine whether a history table includes a specific entry of a channel of the second RAT for the current cell in which the UE 125 is located. If so, the method 700 may continue to block 720, where the UE 125 may attempt to acquire that channel. At block 722, a determination of whether the acquisition is successful may be made. If successful, the method 700 may continue to block 724, where the UE 125 may use the acquired channel to restore service. If not, the method may jump to block 725 to continue with obtaining channels of the second RAT for attempting acquisition thereof. Although FIG. 7A depicts the method 700 as including only one iteration of attempting acquisition of a channel from the history table for the sake of simplicity of the flowchart, it should be understood that the operations at blocks 715, 720 and 722 may be repeated (e.g., in a loop) for each channel entry of the second RAT for the current cell (in order of most recently used) until acquisition of a channel is successful or all of such entries have been tried.

If all of the suitable entries in the history table have been tried without any success, or if the history table does not include any suitable entry, the method 700 may jump to block 725. At block 725, the UE 125 may determine whether a first entry in an MRU (e.g., MRU(0)) is a channel of the second RAT. If so, the method 700 may continue to block 730, where the UE 125 may attempt to acquire that channel. At block 732, a determination of whether the acquisition is successful may be made. If successful, the method 700 may continue to block 734, where the UE 125 may use the acquired channel to restore service. If not, the method may jump to block 735 to continue with obtaining channels of the second RAT for attempting acquisition thereof.

At block 735, the UE 125 may determine whether the MRU and advertised channel information (ADV) have one or more channels of the second RAT in common. If so, the method 700 may continue to block 740, where the UE 125 may attempt to acquire the one common channel or a first common channel (as ordered in the MRU). At block 742, a determination of whether the acquisition is successful may be made. If successful, the method 700 may continue to block 744, where the UE 125 may use the acquired channel to restore service. If not and only one common channel is identified or otherwise determined, the method may jump to block 745 to continue with obtaining channels of the second RAT for attempting acquisition thereof. Although FIG. 7A depicts the method 700 as including only one iteration of attempting acquisition of a common channel for the sake of simplicity of the flowchart, it should be understood that the operations at blocks 735, 740 and 742 may be repeated (e.g., in a loop) for each common channel (in the order of the MRU) until acquisition of one of the common channels is successful or all of the common channels have been tried.

If all of the common channels have been tried without any success, or if there are no channels of the second RAT in common between the MRU and the advertised channel information, the method 700 may jump to block 745. At block 745, the UE 125 may determine whether the MRU includes any other (remaining) channels of the second RAT that have not been tried yet. If so, the method 700 may continue to block 750, where the UE 125 may attempt to acquire the next (most recently used) MRU channel of the second RAT that has not been tried. At block 752, a determination of whether the acquisition is successful may be made. If successful, the method 700 may continue to block 754, where the UE 125 may use the acquired channel to restore service. If not and no more MRU channels of the second RAT are left untried, the method may jump to block 755 (shown in FIG. 7B via page connector A) to continue with obtaining channels of the second RAT for attempting acquisition thereof. Although FIG. 7A depicts the method 700 as including only one iteration of attempting acquisition of a remaining MRU channel of the second RAT for the sake of simplicity of the flowchart, it should be understood that the operations at blocks 745, 750 and 752 may be repeated (e.g., in a loop) for each remaining MRU channel of the second RAT (in the order of the MRU) until acquisition of one of the MRU channels is successful or all of the remaining MRU channels of the second RAT have been tried.

Turning to FIG. 7B, at block 755, the UE 125 may determine whether the advertised channel information (ADV) includes any other (remaining) channels of the second RAT that have not been tried yet. If so, the method 700 may continue to block 760, where the UE 125 may attempt to acquire the next ADV channel of the second RAT that has not been tried. At block 762, a determination of whether the acquisition is successful may be made. If successful, the method 700 may continue to block 764, where the UE 125 may use the acquired channel to restore service. If not and no more ADV channels of the second RAT are left untried, the method may jump to block 765 to continue with obtaining channels of the second RAT for attempting acquisition thereof. If no untried ADV channels of the second RAT are determined to remain at block 755, the method 700 also may jump to block 765. Although FIG. 7B depicts the method 700 as including only one iteration of attempting acquisition of a remaining ADV channel of the second RAT for the sake of simplicity of the flowchart, it should be understood that the operations at blocks 755, 760 and 762 may be repeated (e.g., in a loop) for each remaining ADV channel of the second RAT until acquisition of one of the ADV channels is successful or all of the remaining ADV channels of the second RAT have been tried.

At block 765, the UE 125 may determine whether an Idle GEO List includes any other (remaining) channels of the second RAT that have not been tried yet. If so, the method 700 may continue to block 770, where the UE 125 may attempt to acquire the next idle channel of the second RAT that has not been tried. At block 772, a determination of whether the acquisition is successful may be made. If successful, the method 700 may continue to block 774, where the UE 125 may use the acquired channel to restore service. If not and no more idle channels of the second RAT are left untried, the method may jump to block 775 to continue with obtaining channels of the second RAT for attempting acquisition thereof. If no untried idle channels of the second RAT are determined to remain at block 765, the method 700 also may jump to block 775. Although FIG. 7B depicts the method 700 as including only one iteration of attempting acquisition of a remaining idle channel of the second RAT for the sake of simplicity of the flowchart, it should be understood that the operations at blocks 765, 770 and 772 may be repeated (e.g., in a loop) for each remaining idle channel of the second RAT until acquisition of one of the idle channels is successful or all of the remaining idle channels of the second RAT have been tried.

At block 775, the UE 125 may determine whether an acquisition table includes any other (remaining) channels of the second RAT that have not been tried yet. If so, the method 700 may continue to block 780, where the UE 125 may attempt to acquire the next channel of the second RAT in the acquisition table that has not been tried. At block 782, a determination of whether the acquisition is successful may be made. If successful, the method 700 may continue to block 784, where the UE 125 may use the acquired channel to restore service. If not and no more channels of the second RAT in the acquisition table are left untried, the method may jump to block 785. If no untried channels of the second RAT are determined to remain in the acquisition table at block 775, the method 700 also may jump to block 785. Although FIG. 7B depicts the method 700 as including only one iteration of attempting acquisition of a remaining channel of the second RAT in the acquisition table for the sake of simplicity of the flowchart, it should be understood that the operations at blocks 775, 780 and 782 may be repeated (e.g., in a loop) for each remaining channel of the second RAT in the acquisition table until acquisition of one of the channels is successful or all of the remaining channels of the second RAT in the acquisition table have been tried.

It should be noted, for operations at blocks 720, 730, 740, 750, 760, 770 and 780, that any channels for which acquisition is attempted in a higher prioritized (previous) operation will not be reattempted in a lower prioritized (subsequent) operation.

At block 785, the UE 125 may end the process of attempting to restore service using the second RAT. In some embodiments, the UE 125 also may retry the first RAT using the previously used channel or a different channel of the first RAT.

Figure 8A:
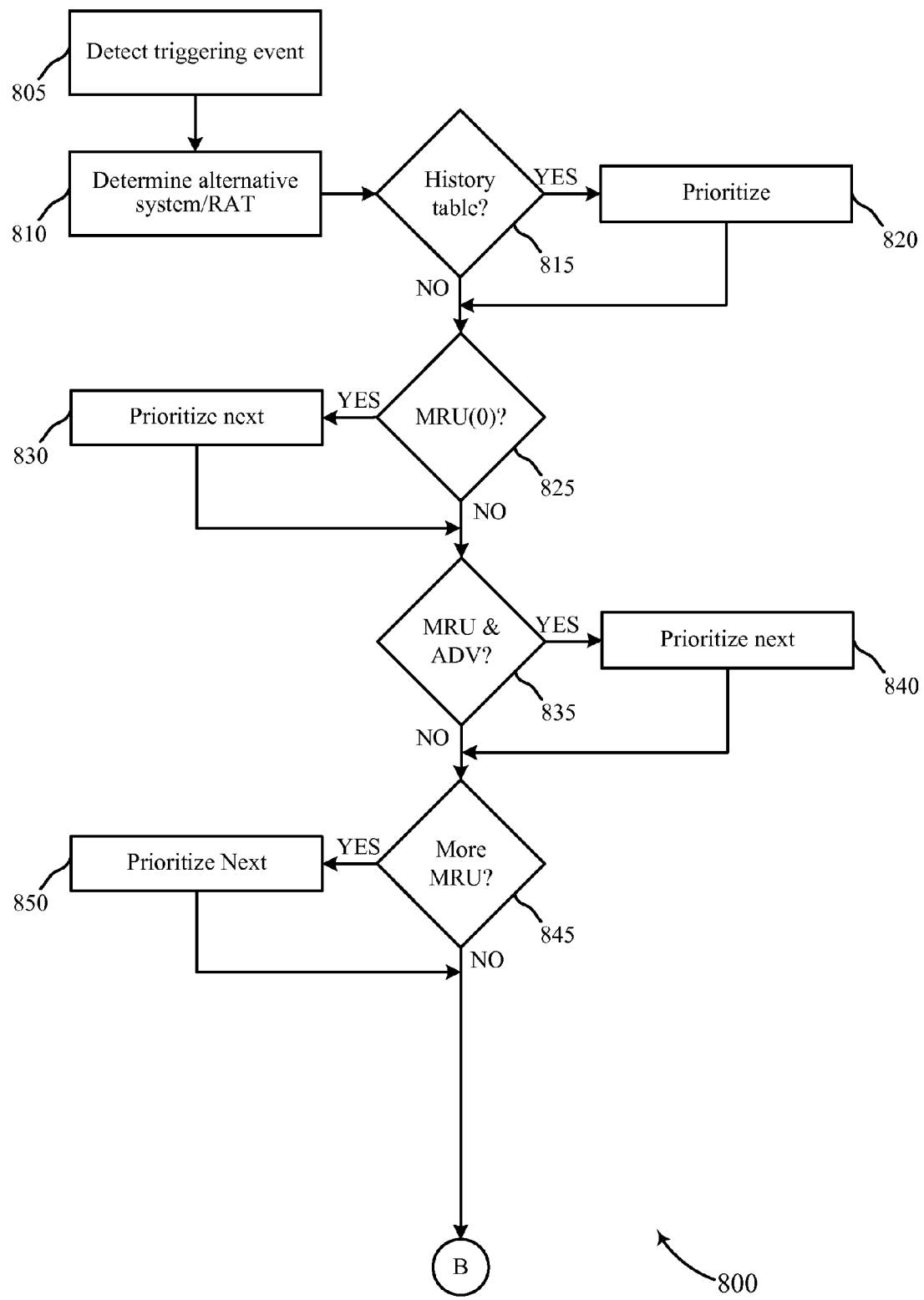
FIGS. 8A and 8B illustrate a method for wireless communication in accordance with the present disclosure.
Figure 8B:
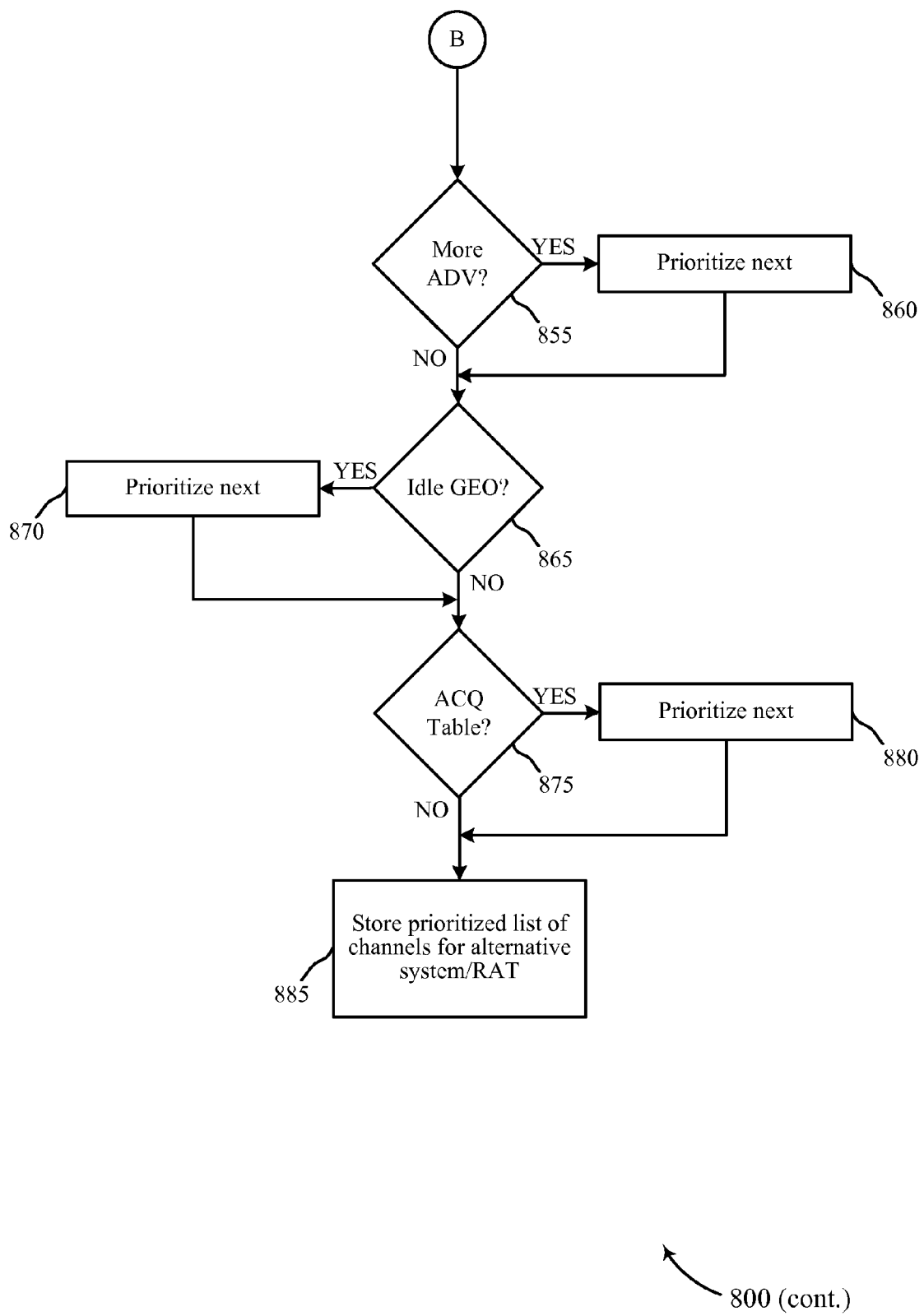

FIGS. 8A and 8B are a flowchart of another method 800 for wireless communications using a wireless communication device. The method 800 may be employed to generate or update a prioritized list of channels for attempting service recovery using an alternative system/RAT upon failure of a connection over a channel of a first RAT. Alternatively, similar methodology may be employed to provide channels of the alternative system/RAT in a prioritized manner for attempting service recovery. For clarity, the method 800 is described below with reference to aspects of one or more of the UEs 125 described with reference to FIGS. 1, 2, 3, 4A, 4B, 4C or 5. In one implementation, a UE 125 or a processor module thereof may execute one or more sets of codes to control the functional elements of the UE 125 to perform the functions described below.

At block 805 in FIG. 8A, the UE 125 may detect a triggering event. In the case where the method 800 is employed to generate or update a prioritized list of channels, the triggering event may be the first powering up of the UE 125 after the UE 125 is provisioned, movement of the UE 125 to a different cell, a change in channel usage, receipt of new channel information (e.g., network advertised channel information), etc. so that the prioritized list is kept up to date. In the case where similar methodology is employed to provide channels in a prioritized manner, the triggering event may be the failure (e.g., RLF) of the current connection over a channel of the first RAT.

Next, at block 810, the UE 125 may determine an alternative system that uses a second RAT, which may be used for service recovery. In some embodiments, the alternative system may be determined, for example, based on the first RAT, the type of communication service to be restored, or any other suitable factors, conditions or parameters. In some embodiments, the UE 125 may be configured to operate with only one alternative system/RAT. In such case, block 810 may be omitted. In other embodiments, a plurality of prioritized lists of channels may be generated and maintained for a corresponding plurality of alternative systems/RATs.

The UE 125 may then proceed to identify channels of the (selected) second RAT in a prioritized manner for attempting acquisition thereof. At block 815, the UE 125 may determine whether a history table includes a specific entry of a channel of the second RAT for the current cell in which the UE 125 is located. If so, the method 800 may continue to block 820, where the UE 125 may prioritize that channel. If multiple entries of channels of the second RAT exist in the history table, the UE 125 may prioritize such channels relative to one another based on when the respective channels were last used (e.g., most recently used being prioritized first, etc.). Once all of the suitable entries in the history table are prioritized, or if no suitable entries exist in the history table, the method may continue/jump to block 825.

At block 825, the UE 125 may determine whether a first entry in an MRU (e.g., MRU(0)) is a channel of the second RAT. If so, the method 800 may continue to block 830, where the UE 125 may prioritize this channel next, after any channels prioritized at block 820. Once the first entry in the MRU is prioritized, or if the first entry in the MRU is not a channel of the second RAT, the method may continue/jump to block 835.

At block 835, the UE 125 may determine whether the MRU and advertised channel information (ADV) have one or more channels of the second RAT in common. If so, the method 800 may continue to block 840, where the UE 125 may prioritize the common channel(s). If a plurality of common channels exist, the common channels may be prioritized relative to one another based on the order of the channels in the MRU. Once all of the common channels are prioritized, or if no common channels exist, the method may continue/jump to block 845.

At block 845, the UE 125 may determine whether the MRU includes any other (remaining) channels of the second RAT that have not been prioritized yet. If so, the method 800 may continue to block 850, where the UE 125 may prioritize the remaining MRU channel(s) (in order of the MRU if multiple channels remain unprioritized). Once all of the remaining MRU channels are prioritized, or if no MRU channels remain to prioritize, the method may continue/jump to block 855 (shown in FIG. 8B via page connector B).

Turning to FIG. 8B, at block 855, the UE 125 may determine whether the advertised channel information (ADV) includes any other (remaining) channels of the second RAT that have not been prioritized yet. If so, the method 800 may continue to block 860, where the UE 125 may prioritize the remaining ADV channel(s). Once all of the remaining ADV channels are prioritized, or if no ADV channels remain to prioritize, the method may continue/jump to block 865.

At block 865, the UE 125 may determine whether an Idle GEO List includes any other (remaining) channels of the second RAT that have not been prioritized yet. If so, the method 800 may continue to block 870, where the UE 125 may prioritize the remaining channel(s) in the Idle GEO List. Once all of the remaining channels in the Idle GEO List are prioritized, or if no channels in the Idle GEO List remain to prioritize, the method may continue/jump to block 875.

At block 875, the UE 125 may determine whether an acquisition table includes any other (remaining) channels of the second RAT that have not been prioritized yet. If so, the method 800 may continue to block 880, where the UE 125 may prioritize the remaining channel(s) in the acquisition table. Once all of the remaining channels in the acquisition table are prioritized, or if no channels in the acquisition table remain to prioritize, the method may continue/jump to block 885.

At block 885, the UE 125 may store the prioritized list of channels, for example, in memory. Thus, when the UE 125 experiences a failure of a connection of a channel of the first RAT, the UE 125 may access the stored prioritized list to obtain channels in the prioritized order for attempting to recover service using the alternative/second RAT.

In some embodiments, maintenance of the channel information may be performed in addition to updates. For example, if a channel listed in the MRU for the alternate/second RAT is relatively old (has not been used for a while), the channel may be removed from the MRU. For example, the UE 125 may be configured to periodically check the channel information in the MRU and delete any listed channel that has not been used within a certain time threshold.

Alternatively or additionally, the UE 125 may be configured to avoid using certain advertised channel information (e.g., for a particular cell) if the UE 125 has found that advertised channel information to not be useful in the past and the advertised channel information does not include prior alternative/second RAT channel information that may still be useful. In some embodiments, the UE 125 may blacklist the advertised information for a particular cell because of prior problems with the information.

In some embodiments, the UE 125 may be configured to query (e.g., periodically) a server for information on channels (e.g., cell history) within the area the UE 125 is currently located (e.g., the UE's current cell and surrounding cells). Alternatively, the server may push such information to the UE 125. Such channel information may replace or be used instead of the network advertised channel information (e.g., SIBs).

In a case where channels of the alternate/second RAT are the same within large geographical areas, various approaches may be used to indicate when the channels of the alternate/second RAT are expected to change. For example, a geofence (e.g., as a polygon) may be used to define a range in which the channels of the alternate/second RAT are expected to remain the same. Alternatively or additionally, the system identifier/network identifier (SID/NID) and packet zone identifier (PZID) may be used to define the range. For LTE, the public land mobile network identifier/tracking area (PLMNID/TA) may be used.

As appropriate or desired, the location of the UE 125 may be determined in various ways. For example, the UE 125 may include a GPS (Global Positioning System) module. Alternatively or additionally, the UE 125 may use femto cell identifiers, WLAN basic service set identifiers (BSSIDs) and the like, along with the associated location estimates, GPS information, etc.

Figure 9:
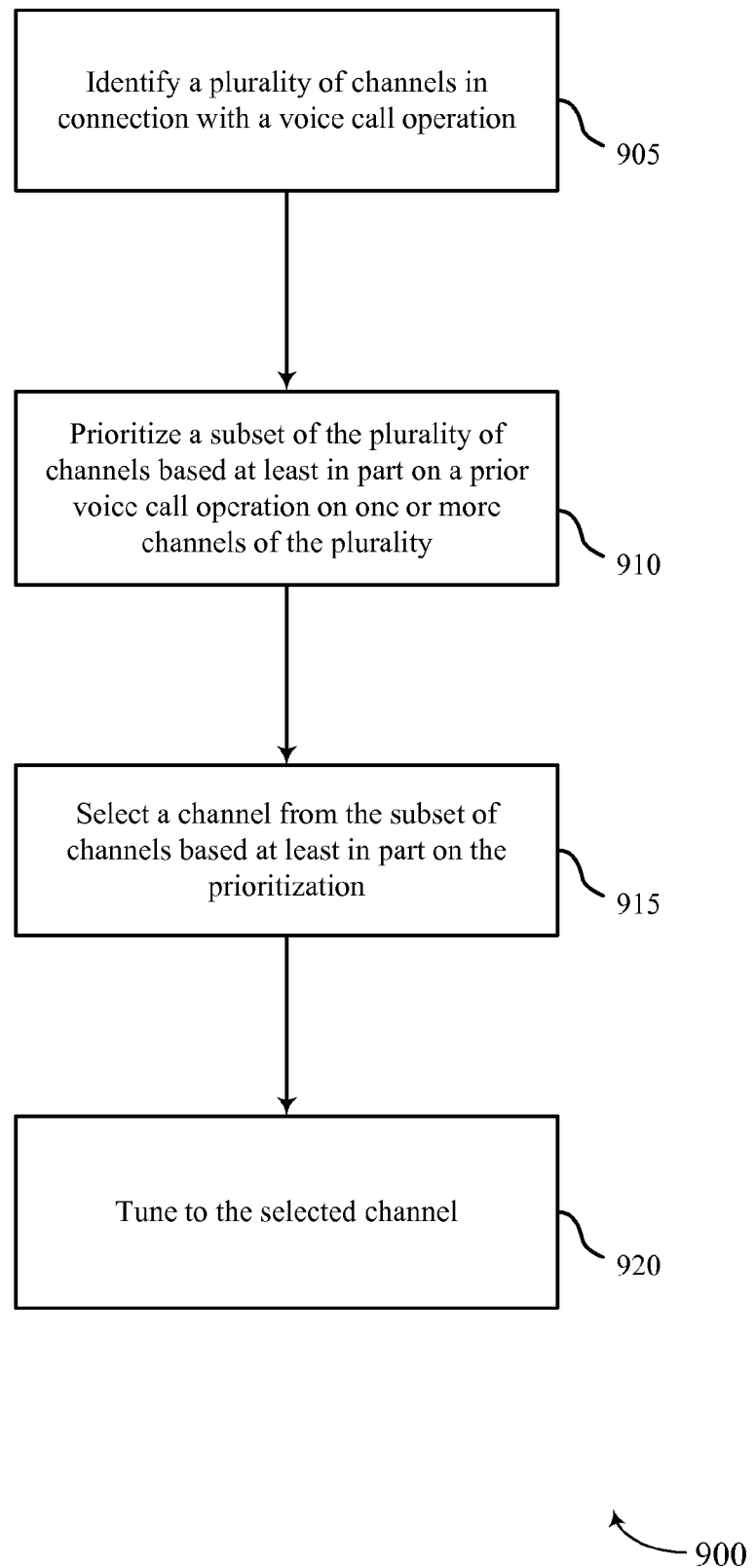
FIG. 9 illustrates a method for wireless communication in accordance with the present disclosure.

FIG. 9 illustrates a method 900 for fast acquisition of systems in accordance with various aspects of the present disclosure. The operations of method 900 may be implemented by a UE 125 or its components as described with reference to FIGS. 1-4C. For example, the operations of method 900 may be performed by the communications management module 415 as described with reference to FIGS. 4A-4C. In some examples, a base station 105 may execute a set of codes to control the functional elements of the UE 125 to perform the functions described below. Additionally or alternatively, the UE 125 may perform aspects the functions described below using special-purpose hardware.

At block 905, the UE 125 may identify a plurality of channels in connection with a voice call operation as described herein with reference to FIGS. 1-4C. In certain examples, the operations of block 905 may be performed by the communications management module 415 as described herein with reference to FIG. 4A.

At block 910, the UE 125 may prioritize a subset of the plurality of channels based on a prior voice call operation on one or more channels of the plurality as described herein with reference to FIGS. 1-4C. The prioritization of the subset of channels may be based on MRU channel information. The channels may include a first channel associated with a first RAT and a second channel associated with a second RAT, which may, for example, be LTE and 1xRTT, respectively. In certain examples, the operations of block 910 may be performed by the communications management module 415 as described herein with reference to FIG. 4A.

At block 915, the UE 125 may select a channel from the subset of channels based on the prioritization as described herein with reference to FIGS. 1-4C. The selected channel may be a previously hashed channel. In certain examples, the operations of block 915 may be performed by the communications management module 415 as described herein with reference to FIG. 4A.

At block 920, the UE 125 may tune to the selected channel as described herein with reference to FIGS. 1-4C. In certain examples, the operations of block 920 may be performed by the communications management module 415 as described herein with reference to FIG. 4A.

Figure 10:
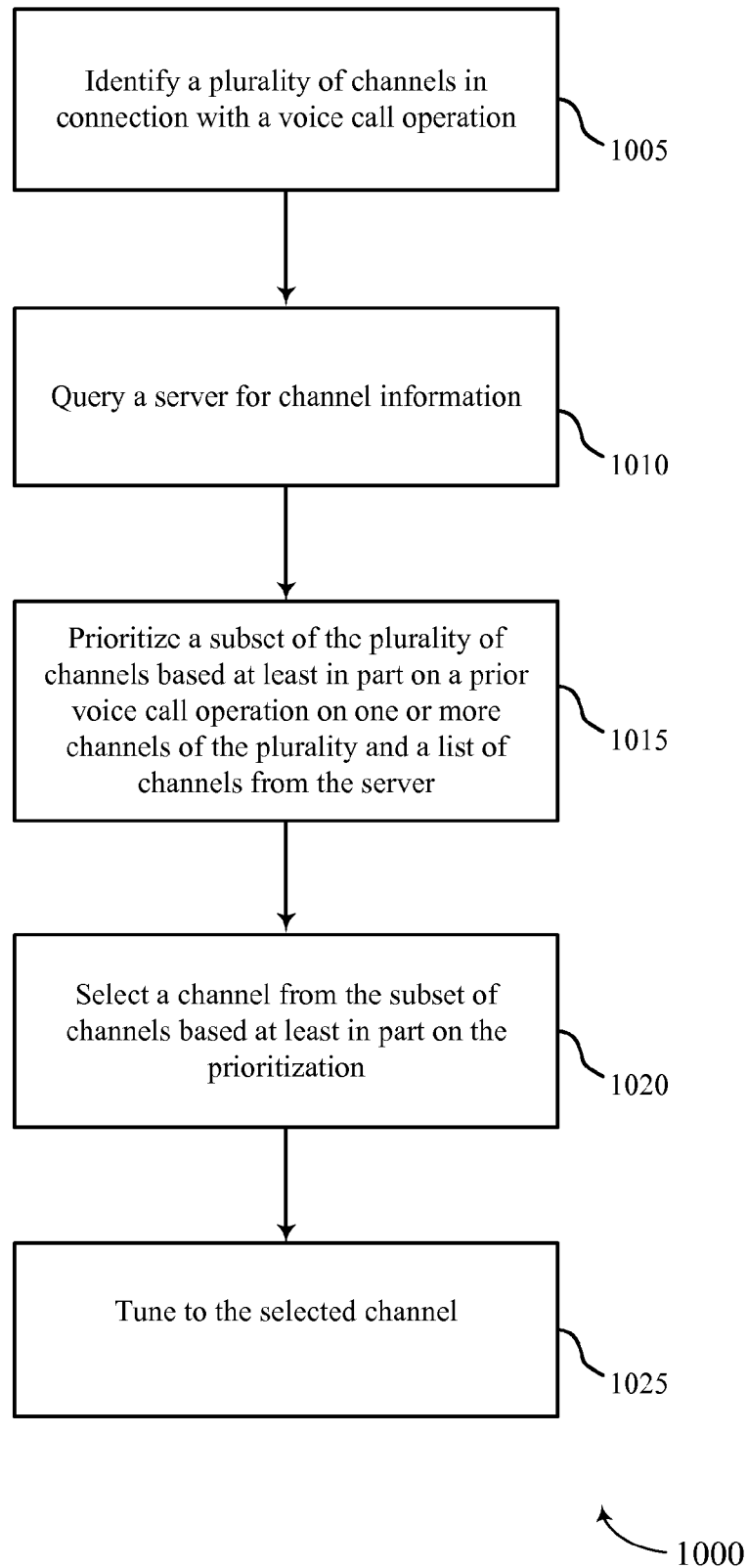
FIG. 10 illustrates a method for wireless communication in accordance with the present disclosure.

FIG. 10 illustrates a method 1000 for fast acquisition of systems in accordance with various aspects of the present disclosure. The operations of method 1000 may be implemented by a UE 125 or its components as described with reference to FIGS. 1-4C. For example, the operations of method 900 may be performed by the communications management module 415 as described with reference to FIGS. 4A-4C. In some examples, a base station 105 may execute a set of codes to control the functional elements of the UE 125 to perform the functions described below. Additionally or alternatively, the UE 125 may perform aspects the functions described below using special-purpose hardware. The method 1000 may also incorporate aspects of method 900 of FIG. 9.

At block 1005, the UE 125 may identify a plurality of channels in connection with a voice call operation as described herein with reference to FIGS. 1-4C. In certain examples, the operations of block 1005 may be performed by the communications management module 415 as described herein with reference to FIG. 4A.

At block 1010, the UE 125 may query a server for channel information as described herein with reference to FIGS. 1-4C. In some cases, the UE 125 may receive a list of channels from the server. In some examples, the list of channels may include the plurality of channels that support voice call operation. In certain examples, the operations of block 1010 may be performed by the call setup sub-module 430 as described herein with reference to FIG. 4B.

At block 1015, the UE 125 may prioritize a subset of the plurality of channels based on a prior voice call operation on one or more channels of the plurality as described herein with reference to FIGS. 1-4C. In some examples, the prioritization is based on the list of channels from the server. In certain examples, the operations of block 1015 may be performed by the communications management module 415 as described herein with reference to FIG. 4A.

At block 1020, the UE 125 may select a channel from the subset of channels based on the prioritization as described herein with reference to FIGS. 1-4C. In certain examples, the operations of block 1020 may be performed by the communications management module 415 as described herein with reference to FIG. 4A.

At block 1025, the UE 125 may tune to the selected channel as described herein with reference to FIGS. 1-4C. In certain examples, the operations of block 1025 may be performed by the communications management module 415 as described herein with reference to FIG. 4A.

Figure 11:
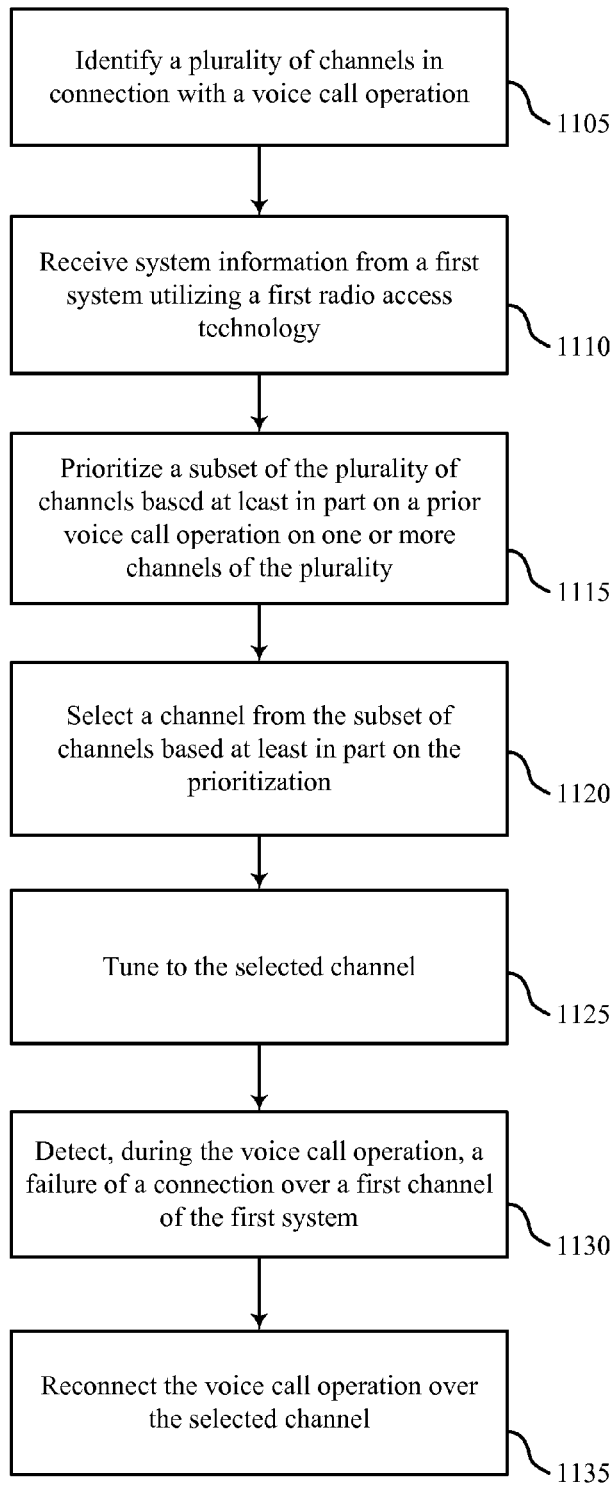
FIG. 11 illustrates a method for wireless communication in accordance with the present disclosure.

FIG. 11 illustrates a method 1100 for fast acquisition of systems in accordance with various aspects of the present disclosure. The operations of method 1100 may be implemented by a UE 125 or its components as described with reference to FIGS. 1-4C. For example, the operations of method 900 may be performed by the communications management module 415 as described with reference to FIGS. 4A-4C. In some examples, a base station 105 may execute a set of codes to control the functional elements of the UE 125 to perform the functions described below. Additionally or alternatively, the UE 125 may perform aspects the functions described below using special-purpose hardware. The method 1100 may also incorporate aspects of methods 900 and 100 of FIGS. 9 and 10.

At block 1105, the UE 125 may identify a plurality of channels in connection with a voice call operation as described herein with reference to FIGS. 1-4C. In certain examples, the operations of block 1105 may be performed by the communications management module 415 as described herein with reference to FIG. 4A.

At block 1110, the UE 125 may receive system information from a first system utilizing a first radio access technology as described herein with reference to FIGS. 1-4C. In some cases, the system information may include advertised channels for a second system utilizing a second radio technology. In some examples, the plurality of channels may include channels of the second system. In certain examples, the operations of block 1110 may be performed by the first RAT connection sub-module 420 as described herein with reference to FIG. 4B.

At block 1115, the UE 125 may prioritize a subset of the plurality of channels based on a prior voice call operation on one or more channels of the plurality as described herein with reference to FIGS. 1-4C. In certain examples, the operations of block 1115 may be performed by the communications management module 415 as described herein with reference to FIG. 4A.

At block 1120, the UE 125 may select a channel from the subset of channels based on the prioritization as described herein with reference to FIGS. 1-4C. In some cases, the selection may be based on the prioritization of the subset of channels and irrespective of the advertised channels from the system information. The UE 125 may, for instance, refrain from hashing the advertised channels according to the received system information. In certain examples, the operations of block 1120 may be performed by the communications management module 415 as described herein with reference to FIG. 4A.

At block 1125, the UE 125 may tune to the selected channel as described herein with reference to FIGS. 1-4C. In certain examples, the operations of block 1125 may be performed by the communications management module 415 as described herein with reference to FIG. 4A.

At block 1130, the UE 125 may detect, during the voice call operation, a failure of a connection over a first channel of the first system as described herein with reference to FIGS. 1-4C. In certain examples, the operations of block 1130 may be performed by the failure detection sub-module 435 as described herein with reference to FIG. 4C.

At block 1135, the UE 125 may reconnect the voice call operation over the selected channel as described herein with reference to FIGS. 1-4C. In certain examples, the operations of block 1135 may be performed by the call setup sub-module 430 as described herein with reference to FIG. 4B.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A computer-readable storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of computer-readable medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   identifying a plurality of channels in connection with a voice call operation;
   prioritizing a subset of the plurality of channels for the voice call operation based at least in part on a prior voice call operation on one or more channels of the plurality of channels and a geographic location associated with the prior voice call operation;
   selecting a channel from the subset of channels based at least in part on the prioritization; and
   tuning to the selected channel.

2. The method of claim 1, further comprising:
   querying a server for channel information, wherein prioritizing the subset of channels is based at least in part on a list of channels from the server, and wherein the plurality of channels comprises channels from the list of channels.

3. The method of claim 1, further comprising:
   receiving, from a first system utilizing a first radio access technology, system information comprising advertised channels for a second system utilizing a second radio access technology, wherein the plurality of channels comprises channels of the second system; and
   selecting the channel based at least in part on the prioritization of the subset of channels and irrespective of the advertised channels from the system information.

4. The method of claim 3, wherein the advertised channels are inconsistent with the prioritization of the subset of channels, and wherein the selecting the channel comprises:
   refraining from hashing the advertised channels according to the received system information.

5. The method of claim 3, further comprising:
   detecting, during the voice call operation, a failure of a connection over a first channel of the first system; and
   reconnecting the voice call operation over the selected channel.

6. The method of claim 5, wherein the first radio access technology comprises a Long Term Evolution (LTE) radio access technology and the second radio access technology comprises a 1x radio transmission technology (1xRTT) radio access technology.

7. The method of claim 1, wherein the prioritization of the subset of channels is based at least in part on most recently used (MRU) channel information.

8. The method of claim 1, wherein the plurality of channels comprise a first channel associated with a first radio access technology and a second channel associated with a second radio access technology.

9. The method of claim 8, wherein the first radio access technology comprises a Long Term Evolution (LTE) radio access technology and the second radio access technology comprises a 1x radio transmission technology (1xRTT) radio access technology.

10. The method of claim 1, wherein the selected channel comprises a previously hashed channel.

11. An apparatus for communication at a wireless device, comprising:
    at least one processor;
    memory in electronic communication with the at least one processor; and
    instructions stored in the memory and operable, when executed by the at least one processor, to cause the at least one processor to:
    identify a plurality of channels in connection with a voice call operation;
    prioritize a subset of the plurality of channels for the voice call operation based at least in part on a prior voice call operation on one or more channels of the plurality of channels and a geographic location associated with the prior voice call operation;
    select a channel from the subset of channels based at least in part on the prioritization; and
    tune to the selected channel.

12. The apparatus of claim 11, the instructions being operable to cause the apparatus to:
    query a server for channel information, wherein prioritizing the subset of channels is based at least in part on a list of channels from the server, and wherein the plurality of channels comprises channels from the list of channels.

13. The apparatus of claim 11, the instructions being operable to cause the apparatus to:
receive system information from a first system utilizing a first radio access technology, wherein the system information comprises advertised channels for a second system utilizing a second radio access technology, and wherein the plurality of channels comprise channels of the second system; and
select the channel based at least in part on the prioritization of the subset of channels and irrespective of the advertised channels from the system information.

14. The apparatus of claim 13, wherein the advertised channels are inconsistent with the prioritization of the subset of channels, and wherein the selecting the channel comprises:
refraining from hashing the advertised channels according to the received system information.

15. The apparatus of claim 13, the instructions being operable to cause the apparatus to:
detect, during the voice call operation, a failure of a connection over a first channel of the first system; and
reconnect the voice call operation over the selected channel.

16. The apparatus of claim 15, wherein the first radio access technology comprises a Long Term Evolution (LTE) radio access technology and the second radio access technology comprises a 1x radio transmission technology (1xRTT) radio access technology.

17. The apparatus of claim 11, wherein the prioritization of the subset of channels is based at least in part on most recently used (IVIRU) channel information.

18. The apparatus of claim 11, wherein the plurality of channels comprise a first channel associated with a first radio access technology and a second channel associated with a second radio access technology.

19. The apparatus of claim 18, wherein the first radio access technology comprises a Long Term Evolution (LTE) radio access technology and the second radio access technology comprises a 1x radio transmission technology (1xRTT) radio access technology.

20. The apparatus of claim 11, wherein the selected channel comprises a previously hashed channel.

21. An apparatus for wireless communication at a wireless device, comprising:
means for identifying a plurality of channels in connection with a voice call operation;
means for prioritizing a subset of the plurality of channels for the voice call operation based at least in part on a prior voice call operation on one or more channels of the plurality of channels and a geographic location associated with the prior voice call operation;
means for selecting a channel from the subset of channels based at least in part on the prioritization; and
means for tuning to the selected channel.

22. The apparatus of claim 21, further comprising:
means for querying a server for channel information, wherein prioritizing the subset of channels is based at least in part on a list of channels from the server, and wherein the plurality of channels comprises channels from the list of channels.

23. The apparatus of claim 21, further comprising:
means for receiving, from a first system utilizing a first radio access technology, system information comprising advertised channels for a second system utilizing a second radio access technology, wherein the plurality of channels comprises channels of the second system; and
means for selecting the channel based at least in part on the prioritization of the subset of channels and irrespective of the advertised channels from the system information.

24. The apparatus of claim 23, wherein the advertised channels are inconsistent with the prioritization of the subset of channels, and wherein the means for selecting the channel comprises:
means for refraining from hashing the advertised channels according to the received system information.

25. The apparatus of claim 23, further comprising:
means for detecting, during the voice call operation, a failure of a connection over a first channel of the first system; and
means for reconnecting the voice call operation over the selected channel.

26. The apparatus of claim 25, wherein the first radio access technology comprises a Long Term Evolution (LTE) radio access technology and the second radio access technology comprises a 1x radio transmission technology (1xRTT) radio access technology.

27. The apparatus of claim 21, wherein the prioritization of the subset of channels is based at least in part on most recently used (MRU) channel information.

28. The apparatus of claim 21, wherein the plurality of channels comprise a first channel associated with a first radio access technology and a second channel associated with a second radio access technology.

29. The apparatus of claim 28, wherein the first radio access technology comprises a Long Term Evolution (LTE) radio access technology and the second radio access technology comprises a 1x radio transmission technology (1xRTT) radio access technology.

30. A non-transitory computer-readable medium storing code for wireless communication, the code comprising instructions executable to:
identify a plurality of channels in connection with a voice call operation;
prioritize a subset of the plurality of channels for the voice call operation based at least in part on a prior voice call operation on one or more channels of the plurality of channels and a geographic location associated with the prior voice call operation;
select a channel from the subset of channels based at least in part on the prioritization; and
tune to the selected channel.

* * * * *